(12) United States Patent
Miyamoto et al.

(10) Patent No.: US 7,936,656 B2
(45) Date of Patent: May 3, 2011

(54) OPTICAL DISC APPARATUS, FOCUS POSITION CONTROL METHOD AND OPTICAL DISC

(75) Inventors: Hirotaka Miyamoto, Kanagawa (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 681 days.

(21) Appl. No.: 11/973,667

(22) Filed: Oct. 9, 2007

(65) Prior Publication Data

US 2008/0089209 A1    Apr. 17, 2008

(30) Foreign Application Priority Data

Oct. 11, 2006    (JP) .............................. JP2006-277875

(51) Int. Cl.
*G11B 7/00*    (2006.01)
(52) U.S. Cl. ................... 369/103; 369/44.37; 369/53.23
(58) Field of Classification Search .................. None
See application file for complete search history.

(56) References Cited

U.S. PATENT DOCUMENTS

| | | | | |
|---|---|---|---|---|
| 2002/0041561 A1* | 4/2002 | Tsukamoto et al. | .......... | 369/103 |
| 2004/0001400 A1* | 1/2004 | Amble et al. | .............. | 369/44.26 |
| 2005/0286386 A1* | 12/2005 | Edwards et al. | .............. | 369/103 |
| 2009/0303856 A1* | 12/2009 | Kadowaki et al. | ............ | 369/103 |

FOREIGN PATENT DOCUMENTS

| | | |
|---|---|---|
| JP | 2001-052374 A | 2/2001 |
| JP | 2003-178484 A | 6/2003 |
| JP | 2005-078691 A | 3/2005 |
| JP | 2005-327328 A | 11/2005 |

* cited by examiner

*Primary Examiner* — Christopher R Lamb
(74) *Attorney, Agent, or Firm* — Wolf, Greenfield & Sacks, P.C.

(57) ABSTRACT

An optical disc apparatus and a focus position control method can highly accurately record recording marks representing information on or reproduce such recording marks from an optical disc. A blue light beam is irradiated onto the target depth to be irradiated by driving an objective lens to focus a red light beam in a reflection/transmission film formed in the optical disc and displacing a movable lens, which is a focus moving section, of a relay lens. A blue light reflection region is formed as part of the reflection/transmission film and the position of the blue light reflection region where the red light focus and the blue light focus are aligned is defined as reference position. The movable lens is displaced by an arbitrarily selected quantity from the reference position according to the target depth.

11 Claims, 14 Drawing Sheets

OPTICAL DISC APPARATUS, FOCUS POSITION CONTROL METHOD AND OPTICAL DISC

CROSS REFERENCE TO RELATED APPLICATIONS

The present invention contains subject matter related to Japanese Patent Application JP 2006-277875 filed in the Japanese Patent Office on Oct. 11, 2006, the entire contents of which being incorporated herein by reference.

BACKGROUND OF THE INVENTION

1. Field of the Invention

This invention relates to an optical disc apparatus, a focus position control method and an optical disc that can suitably find applications in the field of optical disc apparatus for recording holograms on optical discs.

2. Description of the Related Art

An optical disc apparatus for irradiating a light beam onto an optical disc such as a Compact Disc (CD), a Digital Versatile Disc (DVD) or a Blu-ray disc (trademark, to be referred to as BD herein after) and reproducing information by reading light reflected from the optical disc have become highly popular.

Such optical disc apparatus can also record information on an optical disc by irradiating a light beam onto the optical disc, locally changing the reflectivity or the like of the optical disc.

It is known that the size of light spot formed on the optical disc is defined to be approximately equal to $\lambda/NA$ ($\lambda$: wavelength of light beam, NA: numerical aperture) and the resolution is also proportional to that value. For example, Y. Kasami, Y. Kuroda, K. Seo, O. Kawakubo, S. Takagawa, M. Ono and M. Yamada, Jpn. J. Appl. Phys., 39, 756 (2000) describes in detail a BD that has a diameter of 120 mm and can record about 25 GB of data.

Meanwhile, optical discs are adapted to record information of various types such as various contents including music contents and image contents and various data to be used in computers. Particularly, in recent years, the quantity of information to be handled at a time has increased due to availability of high definition images and high sound quality music and a single optical disc is required to record a large number of sets of contents. Thus, there is an increasing demand for optical discs having a larger recording capacity.

As an attempt to meet the demand, techniques for increasing the recording capacity of a single optical disc by laying two or more than two recording layers on a single optical disc have been proposed (see, inter alia, I. Ichimura et al., Technical Digest of ISOM' 04, pp. 52, Oct. 11-15, 2005, Jeju Korea.

On the other hand, optical disc apparatus for using holograms on optical discs as recording technique have been proposed (see, inter alia, R. R. McLeod et al., "Microholographic Multilayer Optical Disk Data Storage", Appl. Opt., Vol. 44, 2005, p.p. 3197.

For example, as shown in FIG. 1, a known optical disc apparatus 1 is designed to converge a light beam emitted from an optical head 7 into an optical disc 8 typically made of photopolymer whose refractive index changes according to the intensity of irradiated light and subsequently converge the light beam once again to the same focus position from the opposite direction by means of a reflection device 9 arranged on the rear surface side of the optical disc 8 (the lower side in FIG. 1).

More specifically, the optical disc apparatus 1 drives a laser 2 to emit a light beam that is a laser beam, modulates the light wave by means of an acousto-optical modulator 3 and collimates the light beam by means of a collimator lens 4. Subsequently, the light beam is transmitted through a polarization beam splitter 5 and turned from linearly polarized light into circularly polarized light by a quarter wavelength plate 6 before it is made to enter the optical head 7.

The optical head 7 is designed to record and reproduce information. It reflects the light beam by means of a mirror 7A, condenses it by means of an objective lens 7B and irradiates it onto the optical disc 8 that is being driven to rotate by a spindle motor (not shown).

The light beam is focused once to the inside of the optical disc 8 and reflected by the reflection device 9 arranged on the rear surface side of the optical disc 8 and then converged to the same focus from the rear surface side in the inside of the optical disc 8. Note that the reflection device 9 is formed by using a condenser lens 9A, a shutter 9B, a condenser lens 9C and a mirror 9D.

Thus, as a result, a standing wave is produced at the focus position of the light beam to form a recording mark RM that is a small hologram having a size of a light spot and a profile formed by bonding two circular cones together at the bottoms thereof. Then, the recording mark RM is recorded as information.

When the optical disc apparatus 1 records a plurality of such recording marks RM in the inside of the optical disc 8, it forms a mark recording layer by arranging the recording marks RM along concentric or spiral tracks, rotating the optical disc 8. Then, the optical disc apparatus 1 can lay a plurality of mark recording layers one on the other to record recording marks RM by adjusting the focus position of the light beam.

Thus, as a result, the optical disc 8 shows a multilayer structure having a plurality of mark recording layers in the inside. For example, in the case of the optical disc 8 shown in FIG. 2B, the distance between adjacent recording marks RM (mark pitch) p1 is 1.5 µm and the distance between two adjacent tracks (track pitch) p2 is 2 µm, while the distance between two adjacent layers p3 is 22.5 µm.

When the optical disc apparatus 1 reproduces information from the optical disc 8 where recording marks RM are recorded, it closes the shutter 9B of the reflection device 9 so that no light beam is irradiated from the rear surface side of the optical disc 8.

At this time, the optical disc apparatus 1 drives the optical head 7 to irradiate a light beam onto a recording mark RM in the optical disc 8 and has the reproduction light beam produced from the recording mark RM enter the optical head 7. The reproduction light beam is turned from circularly polarized light into linearly polarized light by means of the quarter wavelength plate and reflected by the polarization beam splitter 5. Furthermore, the reproduction light beam is condensed by a condenser lens 10 and irradiated onto a photodetector 12 by way of a pinhole 11.

Then, the optical disc apparatus 1 detects the quantity of light of the reproduction light beam by means of the photodetector 12 and reproduces information on the basis of the results of the detection.

SUMMARY OF THE INVENTION

While conventional optical disc apparatus adapted to CDs, DVDs and BDs can give rise to surface shakes and decenterings of the optical disc being driven to rotate, they can accurately irradiate a light beam onto the target track of the optical disc by way of various control operations including focusing control and tracking control on the basis of the outcome of detection of the light beam.

However, the optical disc apparatus 1 illustrated in FIG. 1 is not designed to perform control operations including focusing control and tracking control and hence it is not able to accommodate itself to surface shakes and decenterings that arise to the optical disc.

In other words, the optical disc apparatus 1 does not able to accurately align the focus of the light beam with the desired position in the optical disc 8 and hence may not be able to properly record information on and reproduce information from the optical disc.

In view of the above-identified problem, it is desirable to provide an optical disc apparatus that can highly accurately record recording marks representing information on or reproduce such recording marks from an optical disc, a focus position control method that can highly accurately control the focus position of light to be used for recording or reproducing recording marks and an optical disc that can be used to highly accurately record recording marks representing information.

In an aspect of the present invention, there is provided an optical disc apparatus for recording or reproducing recording marks by irradiating a first light emitted from a light source and a second light having a wavelength different from the first light onto an optical disc by way of a same objective lens, the apparatus including an objective lens drive section that drives the objective lens for focusing the first light in the reflection/transmission layer formed on the optical disc and adapted to reflect the first light and transmit the second light according to the first light reflected by the reflection/transmission layer; a focus moving section that moves the focus of the second light in the direction of the optical axis thereof by way of displacement of itself along the optical axis of the second light to make the focus of the second light agree with the target depth of the optical disc to be irradiated by the second light; and a focus movement control section that displaces the focus moving section by the quantity of displacement corresponding to the target depth from a reference position in order to move the focus of the second light to the target depth; the focus movement control section being adapted to focus the second light on the reflection region formed on part of the reflection/terminal layer to reflect both the first light and the second light according to the second light reflected by the reflection region in a state where the first light is focused on the reflection region and define the position of the focus moving section at the time of the focusing of the second light as reference position.

With this arrangement, according to this aspect of the present invention, it is possible to highly accurately focus the second light in the reflection/transmission layer, using the second light reflected by the reflection region. Thus, it is possible to highly accurately move the second light to the target depth by displacing the focus moving section by a quantity of displacement that corresponds to the target depth from the reference position.

In another aspect of the present invention, there is provided an optical disc apparatus for recording or reproducing recording marks by irradiating a first light emitted from a light source and a second light having a wavelength different from the first light onto an optical disc by way of a same objective lens, the apparatus including an objective lens drive section that drives the objective lens for focusing the first light in the reflection/transmission layer formed on the optical disc and adapted to reflect the first light and reflect and transmit the second light to a predetermined ratio according to the first light reflected by the reflection/transmission layer; a focus moving section that moves the focus of the second light in the direction of the optical axis thereof by way of displacement of itself along the optical axis of the second light to make the focus of the second light agree with the target depth of the optical disc to be irradiated by the second light; and a focus movement control section that displaces the focus moving section by an arbitrarily selected quantity from a reference position in order to move the focus of the second light to the target depth; the focus movement control section being adapted to focus the second light on the reflection/transmission layer according to the second light reflected by the reflection/transmission layer in a state where the first light is focused on the reflection/transmission layer and define the position of the focus moving section at the time of the focusing of the second light as reference position.

With this arrangement, according to this aspect of the present invention, it is possible to highly accurately focus the second light in the reflection/transmission layer, using the second light reflected to a predetermined ratio by the reflection/transmission film. Thus, it is possible to highly accurately move the second light to the target depth by displacing the focus moving section by a quantity of displacement that corresponds to the target depth from the reference position.

In still another aspect of the present invention, there is provided a focus position control method to be used when recording or reproducing recording marks by irradiating a first light emitted from a light source and a second light having a wavelength different from the first light onto an optical disc by way of a same objective lens, the method including a first light focusing step of focusing the first light on the reflection region formed in part of the reflection/transmission layer formed on the optical disc and adapted to reflect the first light and transmit the second light by means of the objective lens driven to focus the first light in the reflection/transmission layer according to the first light reflected by the reflection/transmission layer; a second light focusing step of focusing the second light in the reflection region by means of a focus moving section that moves the focus of the second light by way of displacement of itself along the optical axis of the second light according to the second light reflected by the reflection region in a state where the first light is focused on the reflection region; a reference position defining step of defining the position of the focus moving section at the time of focusing the second light in the reflection region in the second light focusing step as reference position; and a focus position control step of aligning the focus of the second light with the target depth of the optical disc to be irradiated by the second light by displacing the focus moving section from the reference position by the quantity of displacement corresponding to the target depth to be irradiated by the second light in a state where the first light is focused on the reflection region, thereby moving the focus of the second light in the direction of the optical axis of the second light.

With this arrangement, according to this aspect of the present invention, it is possible to highly accurately focus the second light in the reflection/transmission layer, using the second light reflected by the reflection region. Thus, it is possible to highly accurately move the second light to the target depth by displacing the focus moving section by a quantity of displacement that corresponds to the target depth from the reference position.

In still another aspect of the present invention, there is provided an optical disc to be irradiated with the first light and the second light having a wavelength different from the first light by way of a same objective lens, the optical disc including a recording layer that records recording marks by the second light; and a reflection/transmission layer adapted to reflect the first light and transmit the second light; the reflection/transmission layer having a reflection region adapted to reflect both the first light and the second light in part thereof.

With this arrangement, according to this aspect of the present invention, it is possible to reflect the second light by the reflection region. Thus, it is possible to make an optical disc apparatus for recording or reproducing recording marks use the second light and highly accurately focus the second light in the reflection/transmission layer.

Thus, according to the present invention, it is possible to highly accurately focus the second light reflected by the reflection region in the reflection/transmission layer so that it is possible to highly accurately move the second light to the target depth by displacing the focus moving section by the quantity of displacement corresponding to the target depth from the reference position. Then, it is possible to realize an optical disc apparatus that can highly accurately record recording marks representing information on or reproduce such recording marks from an optical disc.

Additionally, according to the present invention, it is possible to highly accurately focus the second light reflected from the reflection/transmission film to a predetermined ratio so that it is possible to highly accurately move the second light to the target depth by displacing the focus moving section by the quantity of displacement corresponding to the target depth from the reference position. Then, it is possible to realize an optical disc apparatus that can highly accurately control the focus position of light to be used for recording or reproducing a hologram.

Thus, according to the present invention, it is possible to highly accurately focus the second light reflected by the reflection region in the reflection/transmission layer so that it is possible to highly accurately move the second light to the target depth by displacing the focus moving section by the quantity of displacement corresponding to the target depth from the reference position. Then, it is possible to realize a focus position control method that can highly accurately record recording marks representing information on or reproduce such recording marks from an optical disc.

Thus, according to the present invention, it is possible to make an optical disc apparatus for operating an optical disc for recording or reproduction use the second light reflected by the reflection region so that it is possible to highly accurately focus the second light in the reflection/transmission layer. Thus, it is possible to realize an optical disc that can highly accurately record holograms representing information.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, embodiments of the present invention will be described in greater detail by referring to the accompanying drawings.

(1) Configuration of Optical Disc

Figures 3A, 3B:
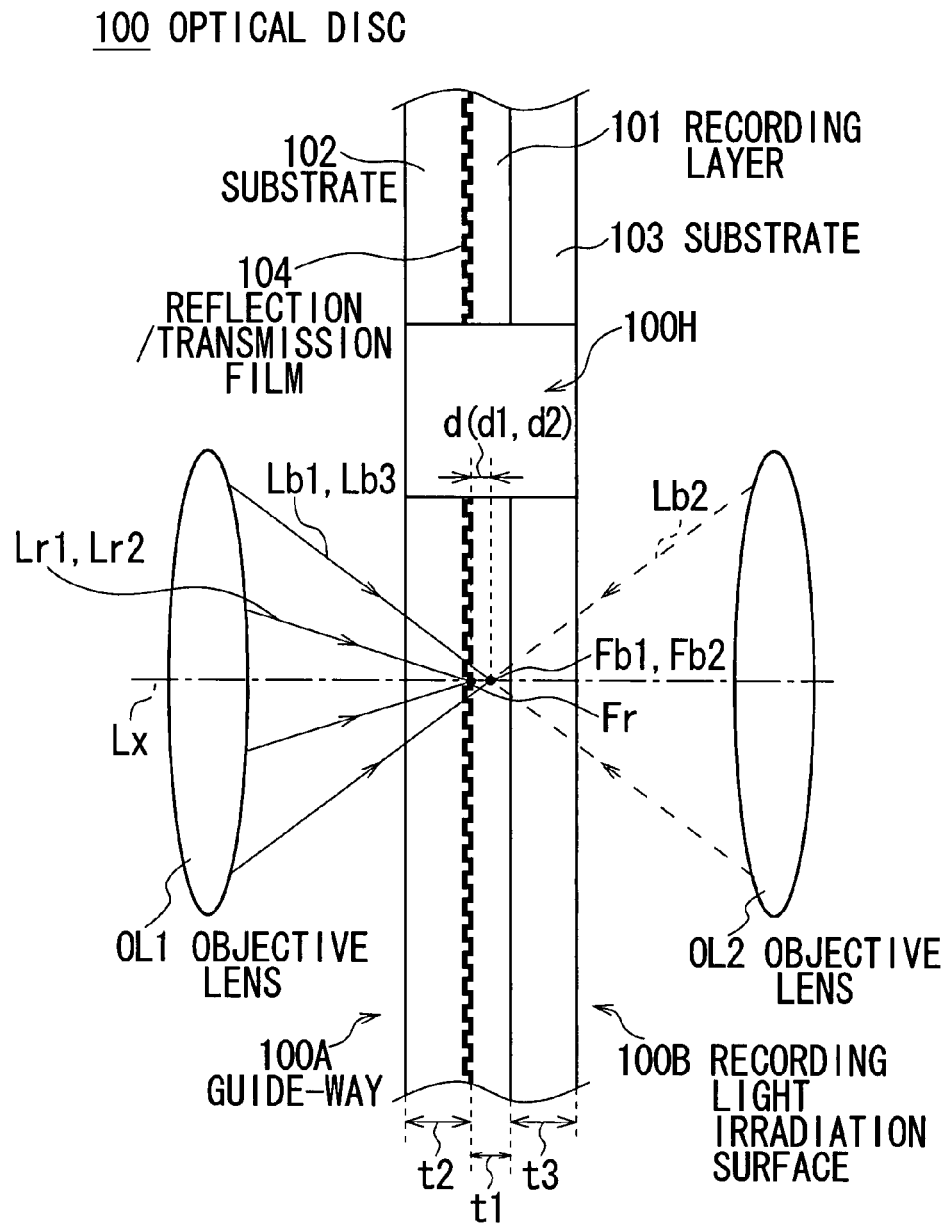
FIGS. 3A and 3B are schematic illustrations of an optical disc according to an embodiment of the present invention.

Firstly, an optical disc 100 to be used as information recording medium according to the present invention will be described. FIG. 3A is a schematic illustration of the optical disc 100, showing the appearance thereof. Referring to FIG. 3A, the optical disc 100 has a diameter of about 120 mm and a hole section 100H is formed at the center thereof like conventional CDs, DVDs and BDs.

As seen from FIG. 3B showing a cross sectional view of the optical disc 100, the optical disc 100 has a recording layer 101 for recording information at the middle thereof, which recording layer 101 is sandwiched by substrates 102 and 103 from the opposite surfaces thereof.

Note that the recording layer 101 has a thickness t1 of about 0.3 mm and the substrates 102 and 103 have respective thicknesses t2 and t3 that are about 0.6 mm.

Both of the substrates 102 and 103 are made of a material typically selected from polycarbonate and glass and transmit light entering from one of the opposite surfaces thereof to the other surface with a high transmission factor. Both of the substrates 102 and 103 have a certain degree of strength to takes a role of protecting the recording layer 101. The surfaces of the substrates 102 and 103 may be prevented from unnecessary reflection by nonreflective coating.

Figure 1:
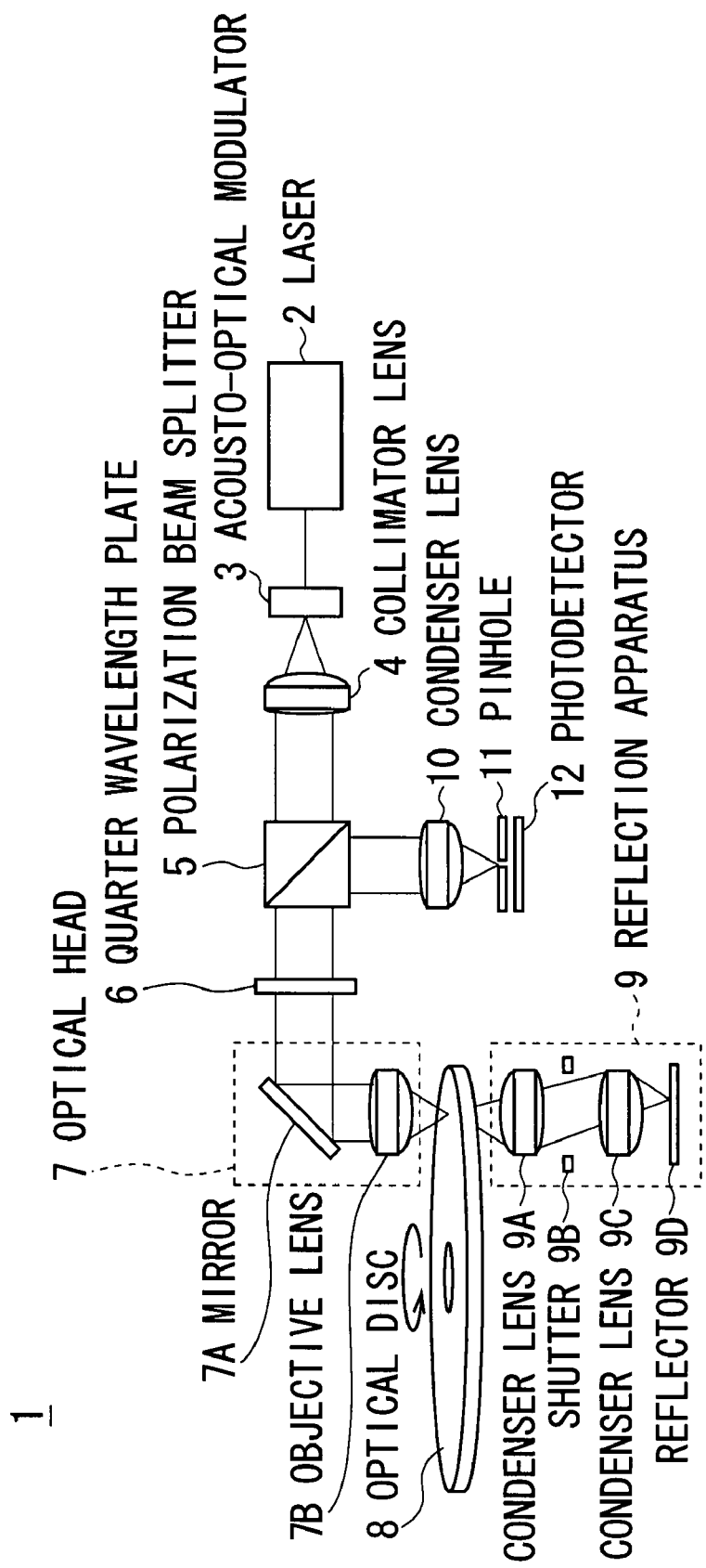
FIG. 1 is a schematic diagram of a known standing wave recording type optical disc apparatus.
Figure 2A:
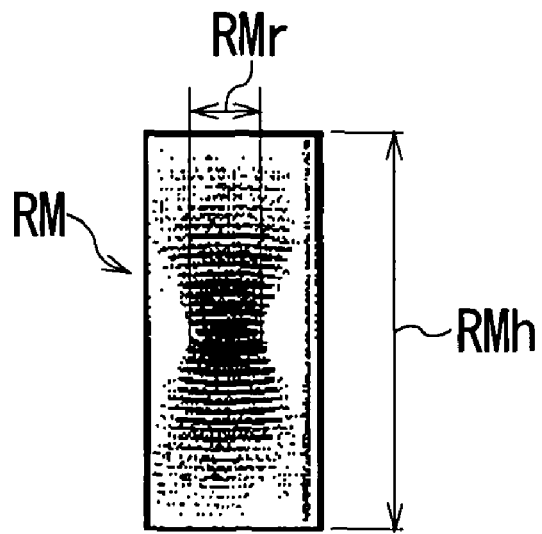
FIGS. 2A and 2B are schematic illustrations of how a hologram is formed.
Figure 2B:
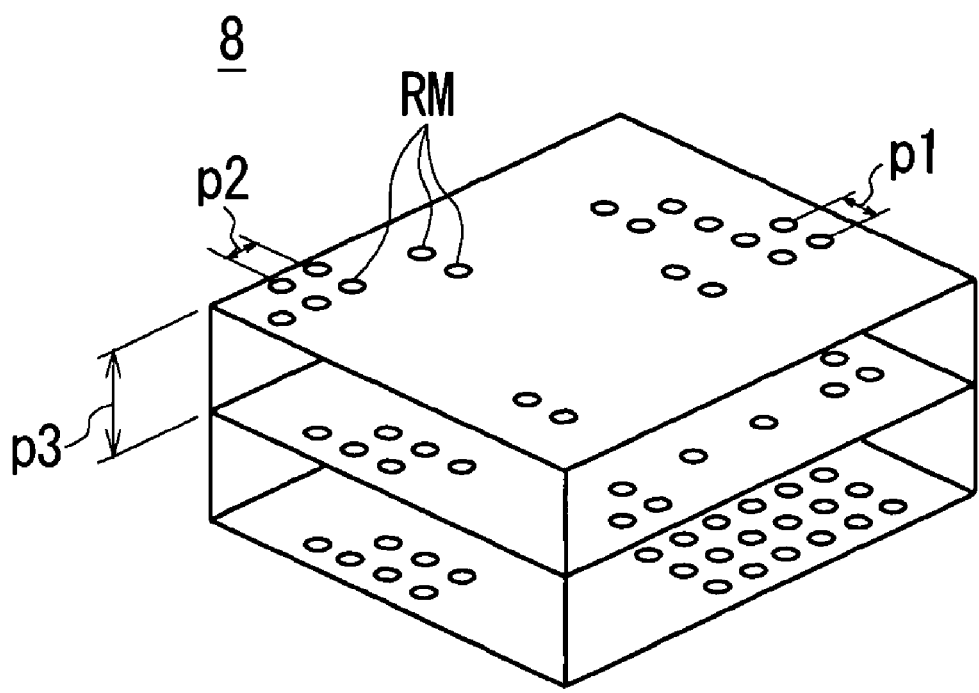

Like the optical disc 8 (FIG. 1), the recording layer 101 is typically made of photopolymer that can change its refractive index as a function of the intensity of light irradiating it and adapted to react to any blue light beam having a wavelength of 405 nm. As shown in FIG. 3B, when two blue light beams Lb1 and Lb2 having a relatively high intensity interfere with each other in the recording layer 101, a standing wave is produced in the recording layer 101 to form an interference pattern showing properties of hologram as illustrated in FIG. 2A.

The optical disc 100 additionally has a reflection/transmission film 104 that operates as reflection layer between the boundary surfaces of the recording layer 101 and the substrate 102. The reflection/transmission film 104 is a dielectric multilayer film and has wavelength selectivity of transmitting blue light beams Lb1, Lb2 and blue reproduction light beam Lb3 having a wavelength of 405 nm and reflecting any red light beam having a wavelength of 660 nm.

The reflection/transmission film 104 has guide grooves to be used for a tracking servo system. More specifically, spiral tracks are formed by lands and grooves like ordinary BD-Rs. The tracks are provided with addresses of a series of numbers for each predetermined recording unit so that the track to be used for recording or reproducing information can be identified by addresses.

Alternatively, the guide grooves of the reflection/transmission film 104 (or the boundary surfaces of the recording layer 101 and the substrate 102) may be replaced by pits. Still alternatively, guide grooves and pits may be combined.

When a red light beam Lr1 is irradiated onto the reflection/transmission film 104 from the side of the substrate 102, the reflection/transmission film 104 reflects it to the side of the substrate 102. The reflected red light beam is referred to as red reflected light beam Lr2 herein after.

The red reflected light beam Lr2 may be used by an optical disc apparatus to make the red light focus Fr of the red light beam Lr1 condensed by a predetermined objective lens OL1 agree with the track to be targeted (to be referred to as target track herein after). That is the red reflected light beam Lr2 may be used for position control (and hence focusing control and tracking control) of the objective lens OL1.

Note that, in the following description, the surface of the optical disc 100 at the side of the substrate 102 is referred to as guide-way 100A, where as the surface of the optical disc 100 at the side of the substrate 103 is referred to as recording light irradiation surface 100B.

When information is recorded on the optical disc 100, the red light beam Lr1 is condensed and focused onto the track of the reflection/transmission film 104 to be targeted (to be referred to as target track herein after) by the position-controlled objective lens OL1 as shown in FIG. 3B.

The blue light beam Lb1 that shares optical axis Lx with the red light beam Lr1 and is condensed by the objective lens OL1 is transmitted through the substrate 102 and the reflection/transmission film 104 and focused to a position at the rear side (and hence at the side of the substrate 102) of the desired track in the recording layer 101. At this time, the blue light beam Lb1 and the blue light focus Fb1 are located remotely relative to the red light focus Fr on the common optical axis Lx as seen from the objective lens OL1 that operates as reference.

Additionally, the blue light beam Lb2 that has a wavelength same as the blue light beam Lb1 and shares the optical axis Lx with it is condensed by another objective lens OL2 having optical characteristics equivalent to objective lens OL1 from the opposite side of the blue light beam Lb1 (and hence the side of the substrate 103) and irradiated onto the optical disc 100. The blue light focus Fb2 of the blue light beam Lb2 is controlled for its position by the objective lens OL2 so as to agree with the blue light focus Fb1 of the blue light beam Lb1.

Then, as a result, a recording mark RM of a relatively small interference pattern is recorded at the position of the blue light focuses Fb1 and Fb2 on the rear side of the target track in the recording layer 101.

At this time, recording mark RM is formed at the part in the recording layer 101 where the blue light beams Lb1 and Lb2 that are converged light beams lie one on the other to show an intensity greater than a predetermined level. Thus, the recording mark RM is made to show a profile formed by bonding two circular cones together at the bottoms thereof but slightly constricted at the middle (where the bottoms are bonded together) as shown in FIG. 2A.

Note that, when the wavelength of the blue light beams Lb1 and Lb2 is λm and the numerical aperture of the objective lenses OL1 and OL2 is NA, the diameter RMr of the constricted part of the recording mark RM at the middle is determined by formula (1) shown below:

$$RMr = 1.2 \times \frac{\lambda}{NA} \quad (1)$$

Additionally, when the refractive index of the objective lenses OL1 and OL2 is n, the height RMh of the recording mark RM is determined by formula (2) shown below:

$$RMh = 4 \times n \times \frac{\lambda}{NA^2} \quad (2)$$

If, for example, the wavelength λ is 405 nm and the numerical aperture NA is 0.5, while the refractive index n is 1.5, the diameter RMr=0.97 μm and the height RMh=9.72 μm are determined respectively from the formulas (1) and (2).

Additionally, the optical disc 100 is so designed that the thickness t1 (=0.3 mm) of the recording layer 101 is significantly greater than the height RMh of the recording mark RM. Therefore, the optical disc 100 is adapted to perform multilayer recording realized by laying a plurality of mark recording layers one on the other in the direction of the thickness of the optical disc 100 and switching the distance (to be referred to as depth herein after) from the reflection/transmission film 104 in the recording layer 101 of the positions for recording marks RM.

Thus, the depth of a recording mark RM is shifted by adjusting the depth of the blue light focuses Fb1 and Fb2 of the blue light beams Lb1 and Lb2 in the recording layer 101 of the optical disc 100. When, for example, the distance p3 separating two adjacent mark recording layers is defined as about 15 μm by taking mutual interference of recording marks RM into consideration, it is possible to form about 20 mark recording layers in the recording layer 101. Note, however, the distance p3 is not limited to about 15 μm and can take any of various values when such values are determined by taking mutual interference of recording marks RM into consideration.

On the other hand, when information is reproduced from the optical disc 100, the objective lens OL1 is so controlled for its position that the red light beam Lr1 condensed by the objective lens OL1 is focused on the target track of the reflection/transmission film 104 as in the case of recording information.

Additionally, the blue light focus Fb1 of the blue light beam Lb1 transmitted through the substrate 102 and the reflection/transmission film 104 by way of the same objective lens OL1 is focused at a position of the target depth (to be referred to as target mark position herein after) that corresponds to the "rear side" of the target track in the recording layer 101.

At this time, the recording mark RM recorded at the position of the blue light focus Fb1 generates a blue reproduction light beam Lb3 from the recording mark RM recorded at the target mark position due to the properties of the recording mark RM as hologram. The blue reproduction light beam Lb3 has optical characteristics equivalent to the blue light beam Lb2 irradiated at the time of recording the recording mark RM so that it proceeds in the direction same as the proceeding direction of the blue light beam Lb2 and hence from the inside of the recording layer 101 to the side of the substrate 102 as divergent light beam.

Thus, when information is recorded on the optical disc 100, the recording mark RM is formed as information at the target mark position that is located at the rear side of the target track and shows the target depth in the reflection/transmission film 104, that is, at the position where the blue light focuses Fb1 and Fb2 lie one on the other in the recording layer 101 as the red light beam Lr1 for position control and the blue light beams Lb1 and Lb2 for information recording are used.

When recorded information is reproduced from the optical disc 100, the optical disc 100 generates a blue reproduction light beam Lb3 from the recording mark RM that is recorded at the position of the blue light focus Fb1, or the target mark position, as the red light beam Lr1 for position control and the blue light beam Lb1 for information reproduction are used.

(2) Configuration of Optical Disc Apparatus

Figure 4:
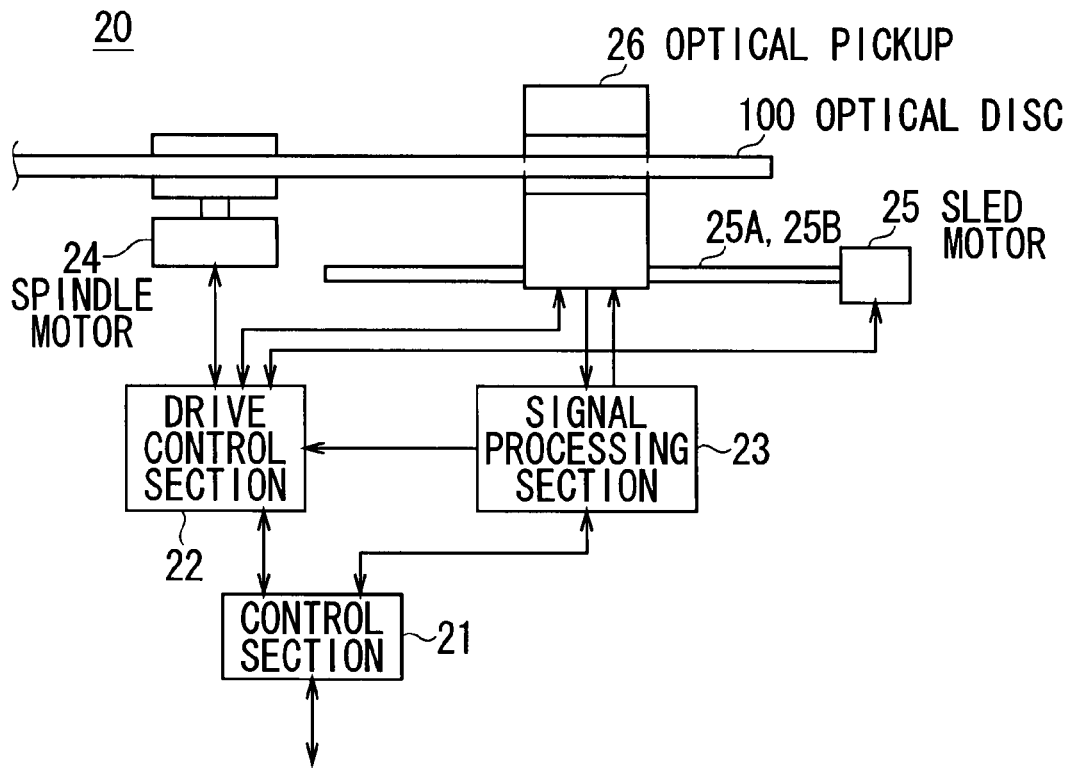
FIG. 4 is a schematic block diagram of an optical disc apparatus according to an embodiment of the present invention.

Now, the optical disc apparatus 20 that corresponds to the above-described optical disc 100 will be described below. As shown in FIG. 4, the control section 21 of the optical disc apparatus 20 collectively controls all the components and the overall operation of the optical disc apparatus 20.

The control section 21 is formed by using a Central Processing Unit (CPU) (not shown) as central and principal component thereof and adapted to read out various programs including a basic program, an information recording program and a blue light focus depth adjusting program from a Read Only Memory (ROM) (not shown) and develop them in a Random Access Memory (RAM) (not shown) to execute various processes including an information recording process.

For example, upon receiving an information recording command, recording information and recording address information from an external apparatus or the like (not shown), the control section 21 supplies a drive command and the recording address information to a drive control section 22 and also supplies the recording information to a signal processing section 23 in the state that the optical disc 100 is loaded. Note that recording address information is information indicating the address or addresses for recording the recording information out of the addresses assigned to the recording layer 101 of the optical disc 100.

The drive control section 22 drives the optical disc 100 to rotate at a predetermined rotary speed by a driving/controlling spindle motor 24 according to the drive command and also moves an optical pickup 26 to the position corresponding to the recording address information in a radial direction (in a direction toward the inner periphery or the outer periphery) along the moving shafts 25A and 25B of the optical pickup 26 by driving/controlling a sled motor 25.

The signal processing section 23 executes various predetermined signal processes including an encoding process and a modulation process on the supplied recording information to generate a recording signal and supplies them to the optical pickup 26.

Figure 5:
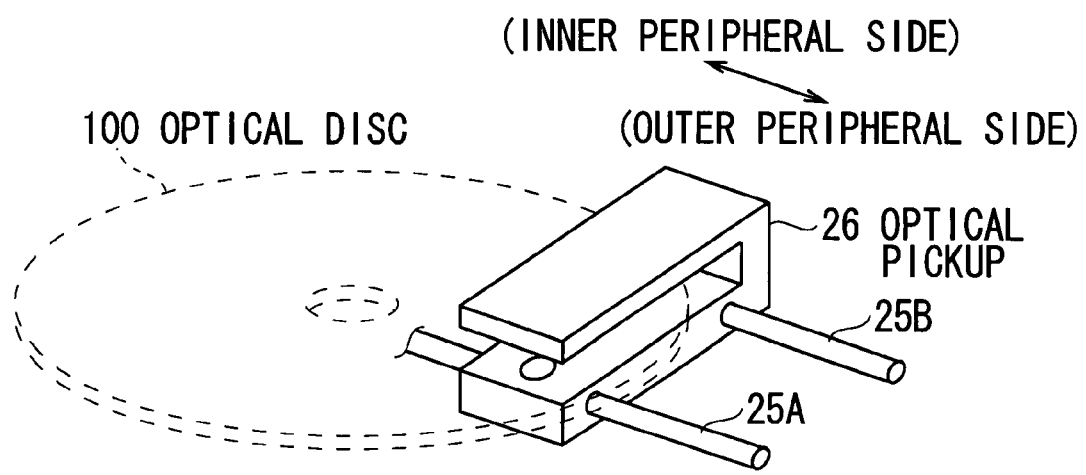
FIG. 5 is a schematic illustration of an optical pickup, showing how it appears.

The optical pickup 26 has a subsequently U-shaped profile as viewed from a lateral side as shown in FIG. 5 so that it can irradiate light beams onto the optical disc 100 from the opposite sides thereof as shown in FIG. 3B.

The optical pickup 26 aligns the irradiating positions of the light beams with the track indicated by the recording address information of the recording layer 101 of the optical disc 100 (to be referred to as target track herein after) by way of focusing control and tracking control under the control of the drive control section 22 (FIG. 4) and records a recording mark RM according to the recording signal from the signal processing section 23 (as will be described in greater detail herein after).

On the other hand, upon receiving an information reproduction command and reproduction address information indicating the address of the recorded information to be reproduced typically from an external apparatus (not shown), the control section 21 supplies a drive command to the drive control section 22 and also supplies a reproduction process command to the signal processing section 23.

As in the case of recording information, the drive control section 22 drives the optical disc 100 to rotate at a predetermined rotary speed by driving/controlling the spindle motor 24 and also moves the optical pickup 26 to the position corresponding to the reproduction address information by controlling/driving the sled motor 25.

The optical pickup 26 aligns the irradiation positions of the light beams with the track indicated by the reproduction address information (or the target track) in the recording layer 101 of the optical disc 100 by focusing control and tracking control under the control of the drive control section 22 (FIG. 4) and irradiates the light beams of a predetermined quantity of light. At this time, the optical pickup 26 detects the reproduction light beam generated from the recording mark RM of the recording layer 101 of the optical disc 100 and supplies a detection signal that corresponds to the quantity of light of the reproduction light beam to the signal processing section 23 (as will be described in greater detail herein after).

The signal processing section 23 generates reproduction information by executing various predetermined signal processes including a demodulation process and a decoding process on the supplied detection signal and supplies the reproduction information to the control section 21. In response, the control section 21 by turn sends out the reproduction information to the external apparatus (not shown).

In this way, the optical disc apparatus 20 records information on the target track and reproduce information from the target track of the recording layer 101 of the optical disc 100 by controlling the optical pickup 26 by means of the control section 21.

(3) Configuration of Optical Pickup

Figure 6:
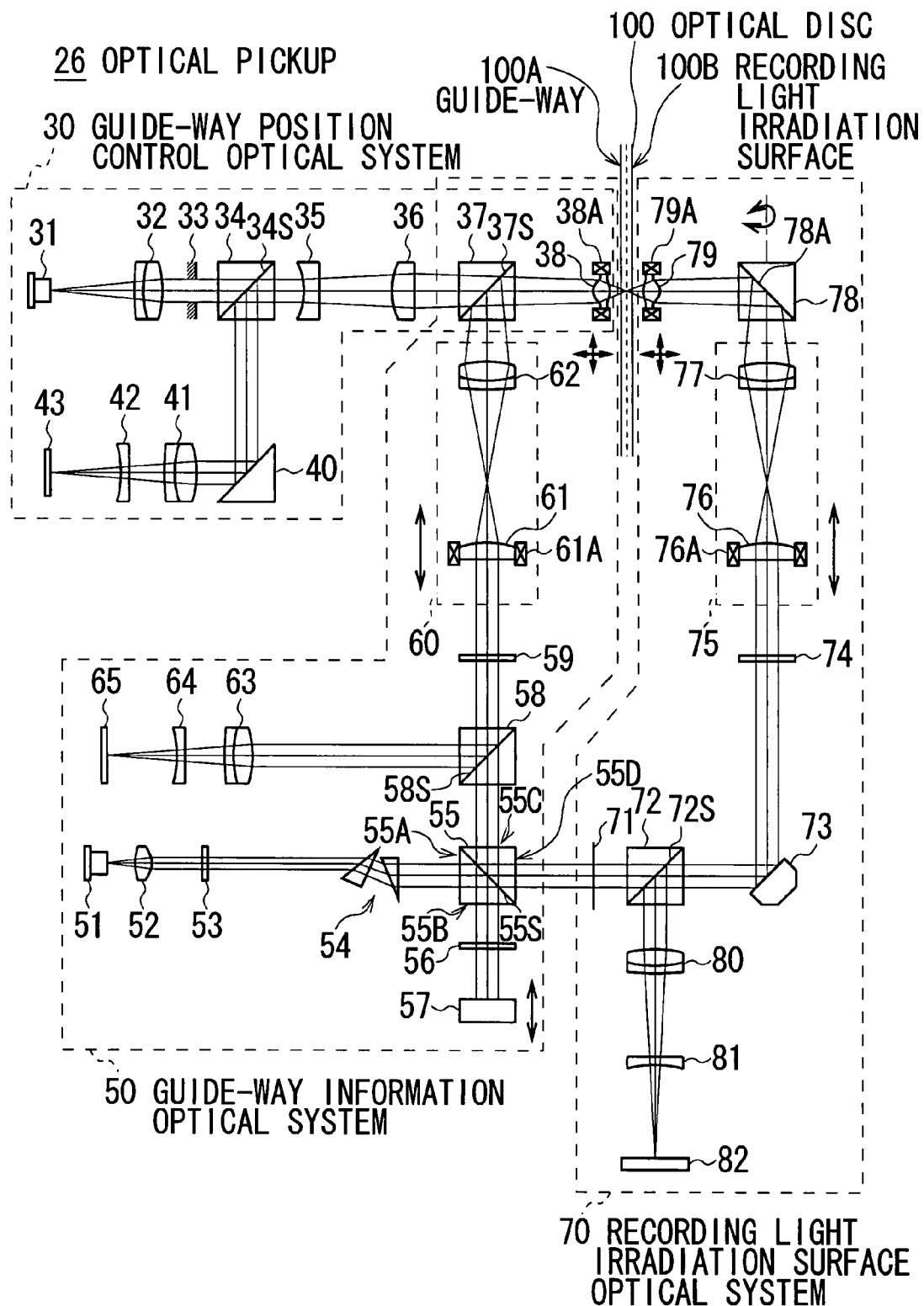
FIG. 6 is a schematic block diagram of an optical pickup, showing the configuration thereof.

Now, the configuration of the optical pickup 26 will be described below. FIG. 6 is a schematic block diagram of an optical pickup, showing the configuration thereof. As shown in FIG. 6, the optical pickup 26 includes a large number of optical parts, which are roughly classified into a guide-way position control optical system 30, a guide-way information optical system 50 and a recording light irradiation surface optical system 70.

(3-1) Configuration of Guide-Way Red Light Optical System

The guide-way position control optical system 30 is adapted to irradiate a red light beam Lr1 onto guide-way 100A of the optical disc 100 and receive red reflected light beam Lr2 that is produced as the red light beam Lr1 is reflected by the guide-way 100A of the optical disc 100.

Figure 7:
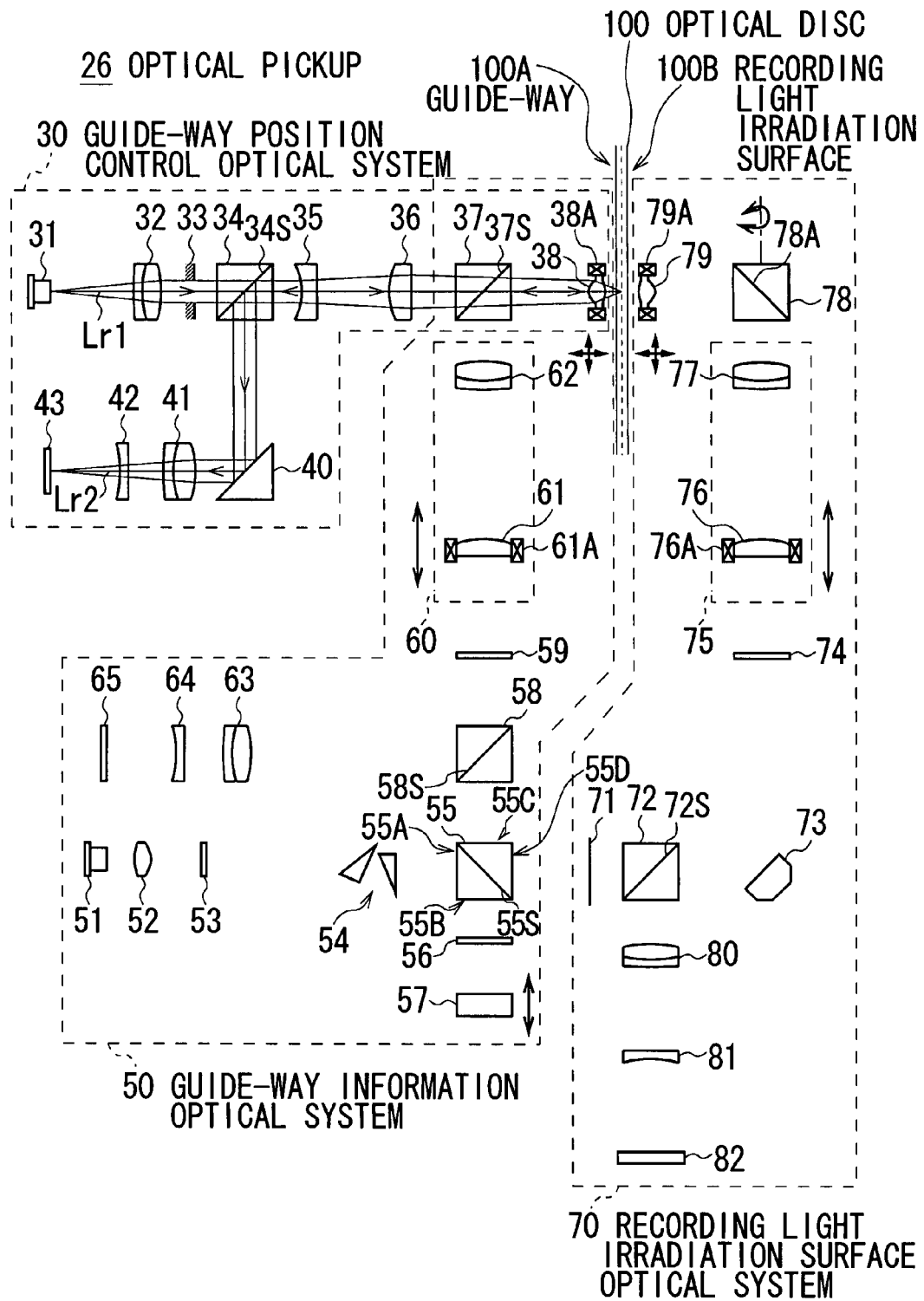
FIG. 7 is a schematic illustration of the optical path of a red light beam.

In FIG. 7, a laser diode 31 of the guide-way position control optical system 30 is adapted to emit a red laser beam of a wavelength of about 660 nm. In operation, the laser diode 31 emits a red light beam Lr1 with a predetermined quantity of light as divergent light beam under the control of the control section 21 (FIG. 4) and makes it enter a collimator lens 32. The collimator lens 32 collimates the divergent light beam of the red light beam Lr1 into a parallel light beam and makes it enter a non-polarization beam splitter 34 through a slit 33.

The non-polarization beam splitter 34 transmits the red light beam Lr1 at the reflection/transmission surface 34A thereof to a ratio of about 50% and enters it into a correction lens 35. Correction lenses 35 and 36 once diverge the red light beam Lr1 and then converge it before they enters it into a dichroic prism 37.

The reflection/transmission plane 37S of the dichroic prism 37 has a so-called wavelength selectivity of showing a transmission factor and a reflection factor that vary as a function of the wavelength of the light beam that enters it. It transmits a red light beam to a ratio of about 100% and reflects a blue light beam to a ratio of about 100%. Thus, the dichroic prism 37 transmits the red light beam Lr1 at the reflection/transmission plane 37S thereof and allows it to enter objective lens 38.

The objective lens 38 condenses the red light beam Lr1 and irradiates it onto the guide-way 100a of the optical disc 100. At this time, the red light beam Lr1 is transmitted through the substrate 102 and reflected by the reflection/transmission film 104 to become red reflected light beam Lr2 that proceeds in the direction opposite to the proceeding direction of the red light beam Lr1.

Note that the objective lens 38 is designed to be optimized by a blue light beam Lb1 and operates as a condenser lens of a Numerical Aperture (NA) of 0.41 for a red light beam Lr1 due to the relationship of the slit 33 and correction lenses 35 and 36 including the optical distances separating them.

Thereafter, the red reflected light beam Lr2 is sequentially transmitted through the objective lens 38, the dichroic prism 37 and the correction lenses 35 and 36 and collimated before it enters the non-polarization beam splitter 34.

The non-polarization beam splitter 34 reflects the red reflected light beam Lr2 to a ratio of about 50% and makes it enter a mirror 40, which reflects the red reflected light beam Lr2 once again and makes it enter a condenser lens 41. The condenser lens 41 converges the red reflected light beam Lr2 and provides the latter with astigmatism by means of a cylindrical lens 42 before it irradiates the red reflected light beam Lr2 onto a photodetector 43.

Since surface shakes can take place to the rotating optical disc 100 in the optical disc apparatus 20, position of the target track can fluctuate relative to the guide-way position control optical system 30.

Therefore, for the guide-way position control optical system 30 to make the red light focus Fr (FIG. 3B) of the red light beam Lr1 to follow the target track, it is necessary to move the red light focus Fr in the focusing direction, which is the direction for moving the red light focus Fr closer to or away from the optical disc 100, and also in the tracking direction, which is the direction for moving the red light focus Fr toward the inner periphery or the outer periphery of the optical disc 100.

Thus, it is so arranged that the objective lens 38 can be driven biaxially by a biaxial actuator 38A both in the focusing direction and in the tracking direction.

Additionally, the various optical parts of the guide-way position control optical system 30 (FIG. 7) are adjusted for their optical positions in such a way that the in-focus state of the red light beam Lr1 when it is condensed and irradiated onto the reflection/transmission film 104 of the optical disc 100 by the objective lens 38 is reflected to the in-focus state of the red light beam Lr2 when it is condensed and irradiated onto the photodetector 43 by the condenser lens 41.

Figure 8:
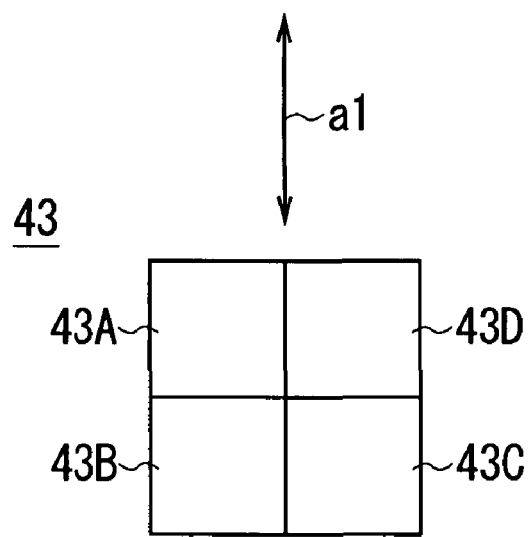
FIG. 8 is a schematic illustration of the detection region of photodetector, showing configuration (1) thereof.

The photodetector 43 has four detection regions 43A, 43B, 43C and 43D produced by dividing the surface thereof to be irradiated with the red reflected light beam Lr2 and arranged like grids as shown in FIG. 8. Note that the direction indicated by arrow a1 (the longitudinal direction) in FIG. 8 corresponds to the direction in which the track is driven to move when the red light beam Lr1 is irradiated onto the reflection/transmission film 104 (FIG. 3).

The photodetector 43 detects parts of the red reflected light beam Lr2 by means of the four detection regions 43A, 43B, 43C and 43D and generates detection signals SDAr, SDBr, SDCr and SDDr that reflect the respective quantities of light detected by the four regions, which detection signals are then sent out to the signal processing section 23 (FIG. 4).

The signal processing section 23 is adapted to operate for focusing control by means of a so-called astigmatic method. It computationally determines the focusing error signal SFEr by means of formula (3) shown below and then sends it out to the drive control section 22.

$$SFEr=(SDAr+SDCr)-(SDBr+SDDr) \qquad (3)$$

The focusing error signal SFEr represents the quantity of the gap between the red light focus Fr of the red light beam Lr1 and the reflection/transmission film 104 of the optical disc 100.

The signal processing section 23 is also adapted to operate for tracking control by means of a so-called push-pull technique. It computationally determines the tracking error signal STEr by means of formula (4) shown below and then sends it out to the drive control section 22.

$$STEr=(SDAr+SDDr)-(SDBr+SDCr) \qquad (4)$$

The tracking error signal STEr represents the quantity of the gap between the red light focus Fr of the red light beam Lr1 and the target track of the reflection/transmission film 104 of the optical disc 100.

The drive control section 22 generates a focusing drive signal SFDr according to the focusing error signal SFEr and supplies the generated focusing drive signal SFDr to the biaxial actuator 38A so as to make the objective lens 38 focus the red light beam Lr1 on the reflection/transmission film 104 of the optical disc 100 by feedback control (that is, focusing control).

Additionally, the drive control section 22 generates a tracking drive signal STDr according to the tracking error signal STEr and supplies the generated tracking drive signal STDr to the biaxial actuator 38A so as to make the objective lens 38 focus the red light beam Lr1 on the target track of the reflection/transmission film 104 of the optical disc 100 by feedback control (that is tracking control).

In this way, the guide-way position control optical system 30 irradiates the red light beam Lr1 onto the reflection/transmission film 104 of the optical disc 100 and supplies the outcome of the reception of the red reflected light beam Lr2 to the signal processing section 23. Then, in response, the drive control section 22 drives the objective lens 38 to operate so as to focus the red light beam Lr1 on the target track of the reflection/transmission film 104 by focusing control and tracking control.

(3-2) Configuration of Guide-Way Blue Light Optical System

The guide-way information optical system 50 is adapted to irradiate a blue light beam Lb1 onto the guide-way 100A of the optical disc 100 and receive blue light beam Lb2 or blue reproduction light beam Lb3 coming in from the optical disc 100.

(3-2-1) Irradiation of Blue Light Beam

Figure 9:
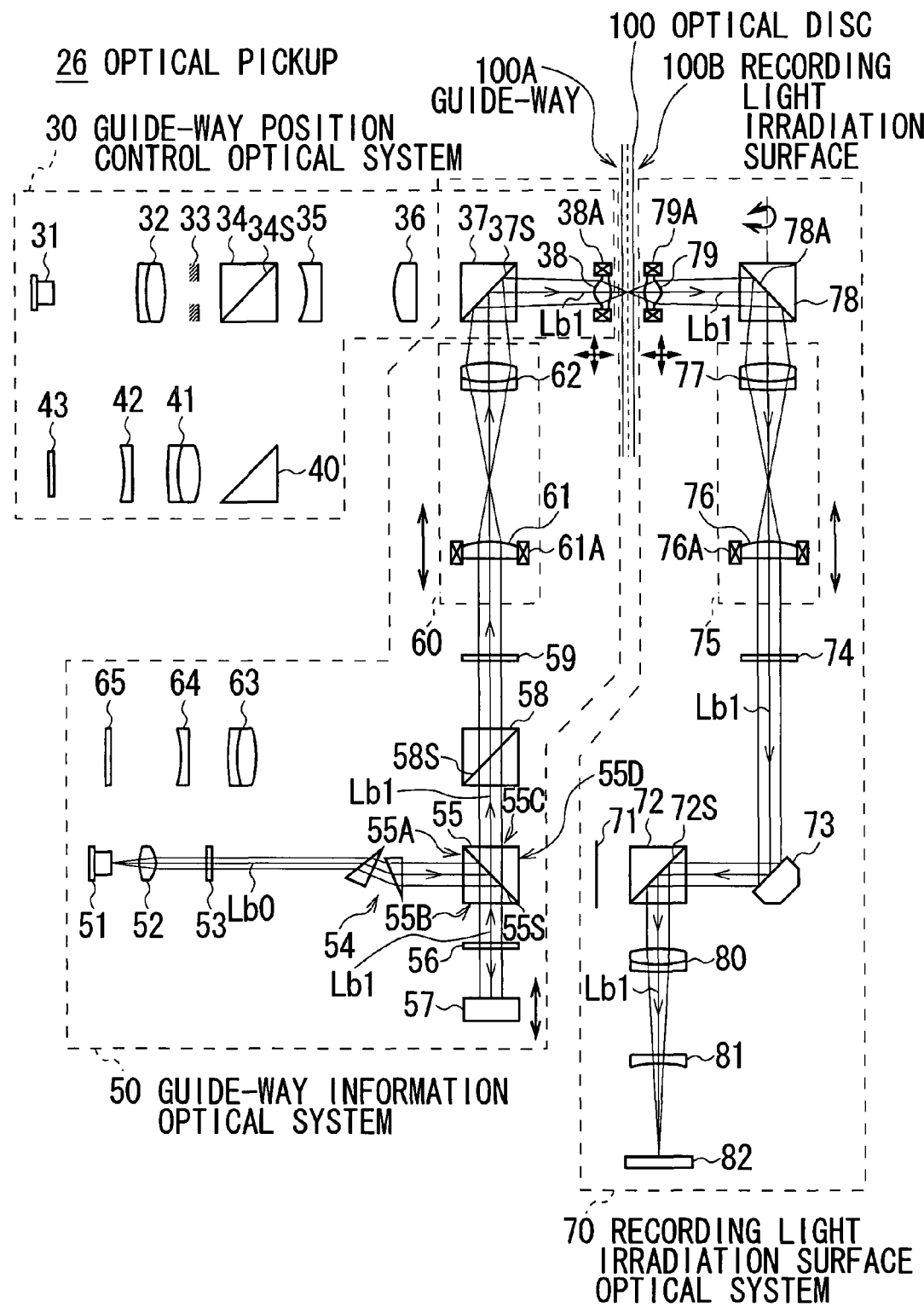
FIG. 9 is a schematic illustration of the optical path (1) of a blue light beam.

In FIG. 9, a laser diode 51 of the guide-way information optical system 50 is adapted to emit a blue laser beam of a wavelength of about 405 nm. In operation, the laser diode 51 emits a blue light beam Lb0 as divergent light beam under the control of the control section 21 (FIG. 4) and makes it enter a collimator lens 52. The collimator lens 52 collimates the divergent light beam of the blue light beam Lb0 into a parallel light beam and makes it enter half-wavelength plate 53.

The blue light beam Lb0 is rotated by the half-wavelength plate 53 by a predetermined angle in terms of direction of polarization and its intensity distribution is formed by an anamorphic prism 54 before it enters a surface 55A of the polarization beam splitter 55.

The reflection/transmission plane 55S of the polarization beam splitter 55 is adapted to reflect or transmit a light beam to a ratio that varies as a function of the direction of polarization of the light beam. For example, the reflection/transmission plane 55S of the polarization beam splitter 55 may be so arranged that it reflects a p-polarized light beam to a ratio of about 50% and transmits the remaining 50% of the beam, where as it transmits an s-polarized light beam to a ratio of about 100%.

In operation, the polarization beam splitter 55 reflects the blue light beam Lb0 that is p-polarized to a ratio of about 50% and allows it to enter a quarter wavelength plate 56 by way of the surface 55B, where as it transmits the remaining 50% and allows it to enter a shutter 71 by way of the surface 55D. In the following description, the blue light beam reflected by the reflection/transmission plane 55S is referred to as blue light beam Lb1 and the blue light beam transmitted through the reflection/transmission plane 55S is referred to as blue light beam Lb2.

The quarter wavelength plate 56 transforms the blue light beam Lb1 from linearly polarized light into circularly polarized light and irradiates it to a movable mirror 57. It transforms the blue light beam Lb1 reflected by the movable mirror 57 from circularly polarized light into linearly polarized light and makes it enter the polarization beam splitter 55 and strike the plane 55B once again.

At this time, the blue light beam Lb1 is transformed from p-polarized light into left-handed circularly polarized light and, when reflected by the movable mirror 57, it is transformed from left-handed circularly polarized light into right-handed circularly polarized light. Thereafter, it is transformed from right-handed circularly polarized light into s-polarized light by the quarter wavelength plate 56 once again. In other words, the blue light beam Lb1 shows different directions of polarization between when it is emitted from the surface 55B and when it is made to strike the surface 55B after reflected by the movable mirror 57.

The polarization beam splitter 55 is adapted to transmit the blue light beam Lb1 by way of the reflection/transmission plane 55S and make it enter a polarization beam splitter 58 from a surface 55C depending on the direction of polarization (s-polarization) of the blue light beam Lb1 entering from the surface 55B.

Thus, as a result, the guide-way information optical system 50 extends the optical path length of the blue light beam Lb1 by means of the polarization beam splitter 55, the quarter wavelength plate 56 and the movable mirror 57.

The reflection/transmission plane 58S of the polarization beam splitter 58 may typically be so arranged that it reflects a p-polarized light beam to a ratio of about 100%, where as it transmits an s-polarized light beam to a ratio of about 100%. In operation, the polarization beam splitter 58 transmits the blue light beam Lb1 through the reflection/transmission plane 58 and transforms it from linearly polarized light (s-polarized light) into circularly polarized light (right-handed circularly polarized light) by means of a quarter wavelength plate 59 before it allows the blue light beam Lb1 to enter a relay lens 60.

The relay lens 60 transforms the blue light beam Lb1 from parallel light into convergent light by means of a movable lens 61. Then, it transforms once again the blue light beam Lb1 that is turned to divergent light after convergence into convergent light by means of a fixed lens 62 before it allows the blue light beam Lb1 to enter the dichroic prism 37.

The movable lens 61 can be moved in the direction of the optical axis of the blue light beam Lb1 by means of an actuator 61A. In operation, the relay lens 60 can change the state of convergence of the blue light beam Lb1 emitted from the fixed lens 62 by moving the movable lens 61 by means of the actuator 61A under the control of the control section 21 (FIG. 4).

The dichroic prism 37 reflects the blue light beam Lb1 at the reflection/transmission plane 37S thereof depending on the wavelength of the blue light beam Lb1 and makes it enter the objective lens 38. Note that the direction of circular polarization of the blue light beam Lb1 is inverted when the blue light beam Lb1 is reflected by the reflection/transmission plane 37S. For example, it is transformed from right-handed circularly polarized light into left-handed circularly polarized light.

The objective lens 38 condenses the blue light beam Lb1 and makes it strike the guide-way 100A of the optical disc 100. Note that the objective lens 38 operates as condenser lens having a numerical aperture NA of 0.5 for the blue light beam Lb1 due to the optical relations with the relay lens 60 including the optical distance between the objective lens 38 and the relay lens 60.

At this time, the blue light beam Lb1 is transmitted through the substrate 102 and the reflection/transmission film 104 and focused in the recording layer 101 as shown in FIG. 3B. The position of the blue light focus Fb1 of the blue light beam Lb1 is determined according to its state of convergence when it is emitted from the fixed lens 62 of the relay lens 60. In other words, the blue light focus Fb1 is moved either to the side of the guide-way 100A or to the side of the recording light irradiation surface 100B of the recording layer 101 depending on the position of the movable lens 61.

In operation, in the guide-way information optical system 50, the position of the movable lens 61 is so controlled by the control section 21 (FIG. 4) as to adjust the depth d1 (the distance from the reflection/transmission film 104) of the blue light focus Fb1 (FIG. 3B) of the blue light beam Lb1 in the recording layer 101 of the optical disc 100. The method of adjusting the depth d1 of the blue light focus Fb1 of the blue light beam Lb1 will be described in detail herein after.

The blue light beam Lb1 is converged and then becomes divergent before it is transmitted through the recording layer 101 and the substrate 103 and emitted from the recording light irradiation surface 100B to enter the objective lens 79 (as will be described in greater detail herein after).

In this way, the guide-way information optical system 50 irradiates the blue light beam Lb1 from the side of the guide-way 100A of the optical disc 100 and places the blue light focus Fb1 of the blue light beam Lb1 in the inside of the recording layer 101. It then adjusts the depth d1 of the blue light focus Fb1 according to the position of the movable lens 61 of the relay lens 60.

(3-2-2) Reception of Blue Light Beam

Meanwhile, the optical disc 100 is adapted to transmit the blue light beam Lb2 irradiated from the objective lens 79 of the recording light irradiation surface optical system 70 onto the recording light irradiation surface 100B thereof and emit it from the guide-way 100A as divergent light (as will be described in greater detail herein after). Note that the blue light beam Lb2 is circularly polarized light (e.g., right-handed circularly polarized light).

Figure 10:
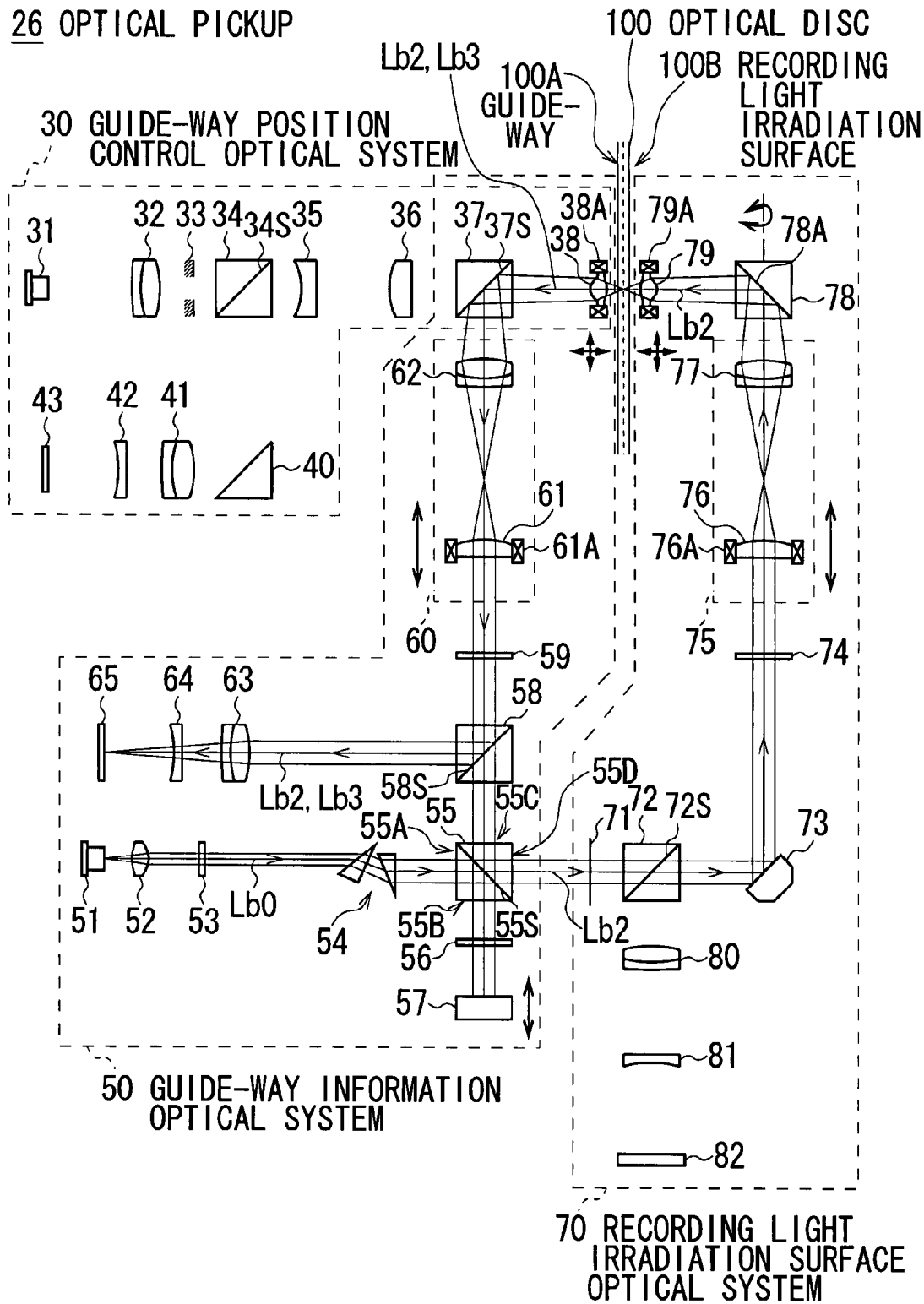
FIG. 10 is a schematic illustration of the optical path (2) of a blue light beam.

Then, the guide-way information optical system 50 converges the blue light beam Lb2 to a certain extent by means of the objective lens 38 and then reflected by the dichroic prism 37 before it is made to enter the relay lens 60 as shown in FIG. 10. Note that, when the blue light beam Lb2 is reflected by the reflection/transmission plane 37S, its direction of circular polarization is inverted and it is transformed typically from right-handed circularly polarized light into left-handed circularly polarized light.

Subsequently, the blue light beam Lb2 is transformed into parallel light by means of the fixed lens 62 and the movable lens 61 of the relay lens 60 and then from circularly polarized light (left-handed circularly polarized light) into linearly polarized light (p-polarized light) by the quarter wavelength plate 59 before it is made to enter the polarization beam splitter 58.

The polarization beam splitter 58 reflects the blue light beam Lb2 depending on the direction of polarization of the blue light beam Lb2 and makes it enter a condenser lens 63. The condenser lens 63 condenses the blue light beam Lb2 and irradiates it onto the photodetector 65 by way of a cylindrical lens 64 that generates astigmatism.

Note that the optical parts of the guide-way information optical system 50 are arranged in such a way that the blue light beam Lb2 is focused on the photodetector 65.

The photodetector 65 detects the quantity of light of the blue light beam Lb2 and generates reproduction detection signal SDp according to the detected quantity of light. It then supplies the generated reproduction detection signal SDp to the signal processing section 23 (FIG. 4).

Note, however, that the reproduction detection signal SDp that is generated according to the quantity of light of the blue light beam Lb2 by the photodetector 65 does not have any particular application. Therefore, although the signal processing section 23 (FIG. 4) is supplied with the reproduction detection signal SDp, it does not execute any signal process on it.

On the other hand, when a recording mark RM is recorded in the recording layer 101, if the blue light focus Fb1 of the blue light beam Lb1 is made to agree with the recording mark RM, the optical disc 100 generates a blue reproduction light beam Lb3 from the recording mark RM due to the properties thereof as hologram.

Due to the principle of hologram, the blue reproduction light beam Lb3 is reemergence of the light beam that is being irradiated besides the blue light beam Lb1 when the recording mark RM is recorded and hence it is the blue light beam Lb2. Therefore, the blue reproduction light beam Lb3 is ultimately irradiated only onto the photodetector 65 after following the optical path same as the blue light beam Lb2 in the guide-way information optical system 50.

As pointed out above, the optical parts of the guide-way information optical system 50 are arranged in such a way that the blue light beam Lb2 is focused to the photodetector 65. Therefore, the blue reproduction light beam Lb3 is focused to the photodetector 65 in the same manner as the blue light beam Lb2.

The photodetector 65 detects the quantity of light of the blue reproduction light beam Lb3 and generates reproduction detection signal SDp according to the detected quantity of light. It then supplies the generated reproduction detection signal SDp to the signal processing section 23 (FIG. 4).

In this case, the reproduction detection signal SDp represents the information recorded in the optical disc 100. Therefore, the signal processing section 23 generates reproduction information by executing predetermined processes such as a demodulation process and a decoding process on the reproduction detection signal SDp and supplies the reproduction information to the control section 21.

In this way, the guide-way information optical system 50 receives the blue light beam Lb2 or the blue reproduction light beam Lb3 that is made to enter the objective lens 38 from the guide-way 100A of the optical disc 100 and supplies the outcome of the reception to the signal processing section 23.

(3-3) Configuration of Recording Light Irradiation Surface Optical System

The recording light irradiation surface optical system 70 (FIG. 6) is adapted to irradiate the blue light beam Lb2 onto the recording light irradiation surface 100B of the optical disc 100 and receive the blue light beam Lb1 irradiated from the guide-way information optical system 50 and transmitted through the optical disc 100.

(3-3-1) Irradiation of Blue Light Beam

In FIG. 10, the polarization beam splitter 55 of the guide-way information optical system 50 transmits the blue light beam Lb0 that is p-polarized light at the reflection/transmission plane 55S to a ratio of about 50% as described above and makes it enter the shutter 71 from the surface 55D as blue light beam Lb2.

The shutter 71 is adapted to block or transmit the blue light beam Lb2 under the control of the control section 21 (FIG. 4). When it transmits the blue light beam Lb2, it allows the blue light beam Lb2 to enter a polarization beam splitter 72.

Note that the shutter 71 may be a mechanical shutter that blocks or transmits the blue light beam Lb2 by mechanically moving a shutter plate for blocking the blue light beam Lb2 or allowing it to pass or a liquid crystal shutter that blocks or transmits the blue light beam Lb2 as the voltage applied to the liquid crystal panel thereof is changed.

The reflection/transmission plane 72S of the polarization beam splitter 72 is adapted to transmit typically a p-polarized light beam to a ratio of about 100% and reflect a s-polarized light beam to a ratio of about 100%. In operation, the polarization beam splitter 72 transmits the blue light beam Lb2 that is p-polarized light and, after having it reflected by a mirror 73, transforms it from linearly polarized light (p-polarized light) into circularly polarized light (left-handed circularly polarized light) by means of a quarter wavelength plate 74, before making it enter a relay lens 75.

The relay lens 75 has a configuration similar to that of the relay lens 60 and has a movable lens 76, an actuator 76A and a fixed lens 77 that correspond respectively to the movable lens 61, the actuator 61A and the fixed lens 62 of the relay lens 60.

The relay lens 75 transforms the blue light beam Lb2 from parallel light into converged light by means of the movable lens 76 and it transforms once again the blue light beam Lb2 that is turned to divergent light after convergence into convergent light by means of the fixed lens 77 before it allows the blue light beam Lb2 to enter a galvano-mirror 78.

Like the relay lens 60, the relay lens 75 can change the state of convergence of the blue light beam Lb2 emitted from the fixed lens 77 by moving the movable lens 76 by means of the actuator 76A under the control of the control section 21 (FIG. 4).

The galvano-mirror 78 reflects the blue light beam Lb2 and allows it to enter the objective lens 79. Note that the direction of circular polarization of the blue light beam Lb2 is inverted when it is reflected. For example, it is transformed from left-handed circularly polarized light into right-handed circularly polarized light.

The galvano-mirror 78 is adapted to change the angle of its reflection plane 78A so that it can adjust the proceeding direction of the blue light beam Lb2 by adjusting the angle of the reflection plane 78A under the control of the control section 21 (FIG. 4).

The objective lens 79 is integrally formed with a biaxial actuator 79A so that it can be driven to move in biaxial directions including the focusing direction for moving closer to or away from the optical disc 100 and the tracking direction for moving toward the inner periphery or the outer periphery of the optical disc 100 like the objective lens 38.

The objective lens 79 condenses the blue light beam Lb2 and irradiates it onto the recording light irradiation surface 100B of the optical disc 100. The objective lens 79 has optical characteristics similar to those of the objective lens 38 and operates as a condenser lens of a numerical aperture (NA) of 0.5 for a blue light beam Lb2 due to the relationship with the relay lens 75 including the optical distance separating them.

As shown in FIG. 3B, the blue light beam Lb2 is transmitted through the substrate 103 and focused in the recording layer 101. The position of the blue light focus Fb2 of the blue light beam Lb2 is determined according to its state of convergence when it is emitted from the fixed lens 77 of the relay lens 75. In other words, like the blue light focus Fb1 of the blue light beam Lb1, the blue light focus Fb2 is moved either to the side of the guide-way 100A or to the side of the recording light irradiation surface 100B of the recording layer 101 depending on the position of the movable lens 76.

More specifically, as in the case of the guide-way information optical system 50, the moving distance of the movable lens 76 and the moving distance of the blue light focus Fb2 of the blue light beam Lb2 are proportional relative to each other in the recording light irradiation surface optical system 70. For example, when the movable lens 76 is moved by 1 mm, the blue light focus Fb2 of the blue light beam Lb2 is moved by 30 μm.

In operation, the depth d2 of the blue light focus Fb2 of the blue light beam Lb2 in the recording layer 101 of the optical disc 100 (FIG. 3B) is adjusted as the position of the movable lens 76 of the relay lens 75 is controlled by the control section 21 (FIG. 4) along with the position of the movable lens 61 of the relay lens 60 in the recording light irradiation surface optical system 70.

Then, the optical disc apparatus 20 aligns the blue light focus Fb2 of the blue light beam Lb2 when the objective lens 79 is located at the reference position with the blue light focus Fb1 of the blue light beam Lb1 when it is assumed by the control section 21 (FIG. 4) that no surface shake takes place to the optical disc 100 (and hence the optical disc 100 is in an ideal condition) and the objective lens 38 is located at the reference position in the recording layer 101.

The blue light beam Lb2 is focused at the blue light focus Fb2 and subsequently transmitted through the recording layer 101, the reflection/transmission film 104 and the substrate 102 as it is becoming divergent before it is emitted from the guide-way 100A and enters the objective lens 38.

In this way, the recording light irradiation surface optical system 70 irradiates the blue light beam Lb2 from the side of the recording light irradiation surface 100B of the optical disc 100 so as to put the blue light focus Fb2 of the blue light beam Lb2 in the recording layer 101 and adjusts the depth d2 of the blue light focus Fb2 according to the position of the of the movable lens 76 of the relay lens 75.

(3-3-2) Reception of Blue Light Beam

Meanwhile, the blue light beam Lb1 irradiated from the objective lens 38 of the guide-way information optical system 50 (FIG. 9) is converged once in the recording layer 101 of the optical disc 100 and turned to divergent light before it is subsequently made to enter the objective lens 79.

After the blue light beam Lb1 is converged to a certain extent by the objective lens 79 of the recording light irradiation surface optical system 70, it is reflected by the galvano-mirror 78 and made to enter the relay lens 75. Note that, when the blue light beam Lb1 is reflected by the reflection plane 78S, its direction of circular polarization is inverted and transformed from left-handed circularly polarized light into right-handed circularly polarized light.

Subsequently, the blue light beam Lb1 is transformed into parallel light by the fixed lens 62 and the movable lens 61 of the relay lens 75 and then from circularly polarized light (right-handed circularly polarized light) into linearly polarized light (s-polarized light) by the quarter wavelength plate 74 before it is reflected by the mirror 73 and made to enter the polarization beam splitter 72.

The polarization beam splitter 72 reflects the blue light beam Lb1 depending on the direction of polarization of the blue light beam Lb1 and makes it enter a condenser lens 80. The condenser lens 80 converges the blue light beam Lb1 and provides it with astigmatism by means of a cylindrical lens 81 before it irradiates the blue light beam Lb1 onto the photodetector 82.

However, the optical disc 100 can give rise to a surface shake or the like. Thus, the objective lens 38 is operated for focusing control and tracking control by the guide-way position control optical system 30, the drive control section 22 (FIG. 4) and other components as described above.

Since the blue light focus Fb1 of the blue light beam Lb1 is moved as the objective lens 38 is moved, the blue light focus Fb1 of the blue light beam Lb1 is shifted from the position of the blue light focus Fb2 of the blue light beam Lb2 when the objective lens 79 is at the reference position to produce a gap between them.

Then, the recording light irradiation surface optical system 70 adjusts the optical positions of its various optical parts in such a way that the quantity of gap between the blue light focus Fb2 of the blue light beam Lb2 and the blue light focus Fb1 of the blue light beam Lb1 is reflected to the state of irradiation of the blue light beam Lb1 onto the photodetector 82 by way of the condenser lens 80.

Figure 11:
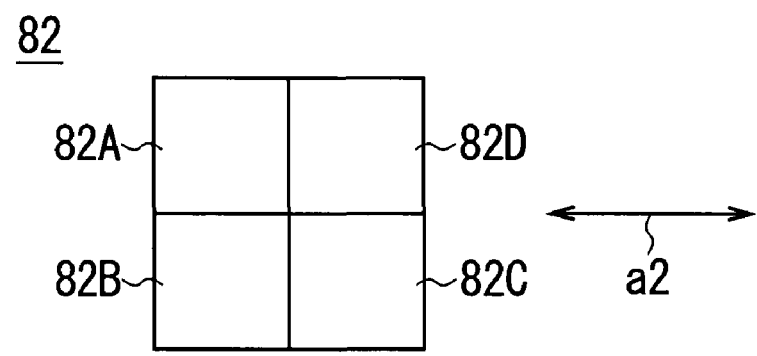
FIG. 11 is a schematic illustration of the detection region of photodetector, showing configuration (2) thereof.

As shown in FIG. 11 and like the photodetector 43, the photodetector 82 has four detection regions 82A, 82B, 82C and 82D produced by dividing the surface thereof to be irradiated with the blue light beam Lb1 and arranged like grids. Note that the direction indicated by arrow a2 (the transversal direction) in FIG. 11 corresponds to the direction in which the track is driven to move when the blue light beam Lb1 is irradiated onto the reflection/transmission film 104 (FIG. 3).

The photodetector 82 detects parts of the blue light beam Lb1 by means of the four detection regions 82A, 82B, 82C and 82D and generates detection signals SDAb, SDBb, SDCb and SDDb that reflect the respective quantities of light detected by the four regions, which detection signals are then sent out to the signal processing section 23 (FIG. 4).

The signal processing section 23 is adapted to operate for focusing control by means of a so-called astigmatic method.

It computationally determines the focusing error signal SFEb by means of formula (5) shown below and then sends it out to the drive control section 22.

$$SFEb=(SDAb+SDCb)-(SDBb+SDDb) \quad (5)$$

The focusing error signal SFEb represents the quantity of the gap between the blue light focus Fr1 of the blue light beam Lb1 and the blue light focus Fb2 of the blue light beam Lb2 in the focusing direction.

The signal processing section 23 is also adapted to operate for tracking control by means of a push-pull signal. It computationally determines the tracking error signal STEb by means of formula (6) shown below and then sends it out to the drive control section 22.

$$STEb=(SDAb+SDBb)-(SDCb+SDDb) \quad (6)$$

The tracking error signal STEb represents the quantity of the gap between the blue light focus Fb1 of the blue light beam Lb1 and the blue light focus Fb2 of the blue light beam Lb2 in the tracking direction.

The signal processing section 23 is also adapted to generate a tangential error signal that is necessary for tangential control. Tangential control is control for moving the blue light focus Fb2 of the blue light beam Lb2 to the target position in terms of the tangential direction (relative to the track).

More specifically, the signal processing section 23 is adapted to operate for tangential control by means of a push-pull signal. It computationally determines the tangential error signal SNEb by means of formula (7) shown below and supplies it to the drive control section 22.

$$SNEb=(SDAb+SDDb)-(SDBb+SDCb) \quad (7)$$

Thus, the tangential error signal SNEb represents the quantity of gap between the blue light focus Fb1 of the blue light beam Lb1 and the blue light focus Fb2 of the blue light beam Lb2 in the tangential direction.

In response, the drive control section 22 generates a focusing drive signal SFDb according to the focusing error signal SFEb and supplies the focusing drive signal SFDb to the biaxial actuator 79A. In this way, the drive control section 22 controls the objective lens 79 for focusing control so as to reduce the quantity of gap between the blue light focus Fb1 of the blue light beam Lb1 and the blue light focus Fb2 of the blue light beam Fb2 in the focusing direction.

Similarly, the drive control section 22 generates a tracking drive signal STDb according to the tracking error signal STEb and supplies the tracking drive signal STDb to the biaxial actuator 79A. In this way, the drive control section 22 controls the objective lens 79 for tracking control so as to reduce the quantity of gap between the blue light focus Fb1 of the blue light beam Lb1 and the blue light focus Fb2 of the blue light beam Fb2 in the tracking direction.

Likewise, the drive control section 22 generates a tangential drive signal SNDb according to the tangential error signal SNEb and supplies the tangential drive signal SNDb to the galvano-mirror 78. In this way, the drive control section 22 adjust the angle of the reflection plane 78A of the galvano-mirror 78 for tangential control so as to reduce the quantity of gap between the blue light focus Fb1 of the blue light beam Lb1 and the blue light focus Fb2 of the blue light beam Fb2 in the tangential direction.

In this way, the recording light irradiation surface optical system 70 receives the blue light beam Lb1 entering the objective lens 79 from the recording light irradiation surface 100B of the optical disc 100 and supplies the outcome of the reception of light to the signal processing section 23. In response, the drive control section 22 operates for focusing control and tracking control of the objective lens 79 and tangential control of the galvano-mirror 78 so as to align the blue light focus Fb2 of the blue light beam Lb2 with the blue light focus Fb1 of the blue light beam Lb1.

(3-4) Adjustment of Optical Path Length

Meanwhile, in an information recording operation, the optical pickup 26 of the optical disc apparatus 20 records the recording mark RM at the target mark position in the recording layer 101 of the optical disc 100 by separating the blue light beams Lb1 and Lb2 out of the blue light beam Lb0 by means of the polarization beam splitter 55 (FIG. 9) and causing the blue light beams Lb1 and Lb2 to interfere with each other in the recording layer 101.

The laser diode 51 that emits the blue light beam Lb0 is required to make the coherent length of the blue light beam Lb0 not less than the hologram size (that is the height RMh of the recording mark RM) in order to properly record the recording mark RM as hologram in the recording layer 101 of the optical disc 100, satisfying the general hologram forming conditions.

For the laser diode 51, in actuality, the coherent length is substantially equal to the product of multiplication of the length of the resonator (not shown) arranged in the laser diode 51 and the refractive index of the resonator as in the case of ordinary laser diodes. Thus, the coherent length may be between about 100 μm and about 1 mm.

On the other hand, in the optical pickup 26, the blue light beam Lb1 passes through its optical path in the guide-way information optical system 50 (FIG. 9) and is irradiated from the side of the guide-way 100A of the optical disc 100, while the blue light beam Lb2 passes through its optical path in the recording light irradiation surface optical system 70 (FIG. 10) and is irradiated from the side of the recording light irradiation surface 100B of the optical disc 100. In other words, the optical path of the blue light beam Lb1 and that of the blue light beam Lb2 differ from each other and hence the lengths of the optical paths (from the laser diode 51 to the target mark position) give rise to a difference.

Additionally, the optical pickup 26 changes the depth of the target mark position (target depth) in the recording layer 101 of the optical disc 100 by adjusting the positions of the movable lenses 61 and 76 of the relay lenses 60 and 75. Then, the optical pickup 26 consequently changes the optical path length of the blue light beam Lb1 and that of the blue light beam Lb2 as it changes the depth of the target mark position.

However, for the optical pickup 26 to form an interference pattern, it is necessary that the difference of the optical path lengths of the blue light beams Lb1 and Lb2 is not greater than the coherent length (which is between about 100 μm and 1 mm) due to the general hologram forming conditions.

Thus, the control section 21 (FIG. 4) adjusts the optical path length of the blue light beam Lb1 by controlling the position of the movable mirror 57. More specifically, the control section 21 changes the optical path length of the blue light beam Lb1 by moving the movable mirror 57 according to the position of the movable lens 61, utilizing the relationship between the position of the movable lens 61 of the relay lens 60 and the depth of the target mark position.

Then, as a result, the optical pickup 26 can suppress the difference of the optical path lengths of the blue light beams Lb1 and Lb2 to not greater than the coherent length so that can record a recording mark RM that is a good hologram at the target mark position in the recording layer 101.

In this way, the control section 21 of the optical disc apparatus 20 suppresses the difference of the optical path lengths of the blue light beams Lb1 and Lb2 in the optical pickup 26 to not greater than the coherent length by controlling the position of the movable mirror 57 and consequently can record a good recording mark RM at the target mark position in the recording layer 101 of the optical disc 100.

(4) Recording and Reproduction of Information (4-1) Recording of Information on Optical Disc For recording information on the optical disc 100, as the control section 21 of the optical disc apparatus 20 (FIG. 4) receives an information recording command, recording information and recording address information from an external apparatus (not shown) as described above, it supplies a drive command and the recording address information to the drive control section 22 and the recording information to the signal processing section 23.

At this time, the drive control section 22 irradiates a red light beam Lr1 onto the optical disc 100 from side of the guide-way 100A of the optical disc 100 by means of the guide-way position control optical system 30 (FIG. 7) of the optical pickup 26 and operates for focusing control and tracking control (and hence position control) of the objective lens 38 according to the outcome of the detection of the red reflected light beam Lr2 that is produced as the red light beam Lr1 is reflected by the guide-way 100A of the optical disc 100 to make the red light focus Fr of the red light beam Lr1 follow the target track that corresponds to the recording address information.

Additionally, the control section 21 irradiates a blue light beam Lb1 onto the optical disc 100 from the side of the guide-way 100A of the optical disc 100 by means of the guide-way information optical system 50 (FIG. 9). The blue light beam Lb1 is converged by the objective lens 38 that is controlled for its position in such a way that the blue light focus Fb1 of the blue light beam Lb1 is located at a position on the side of the optical disc 100 opposite to the side of the target track.

Additionally, the control section 21 adjusts the depth d1 of the blue light focus Fb1 (FIG. 3B) so as to make it agree with the target depth by adjusting the position of the movable lens 61 of the relay lens 60. Thus, as a result, the blue light focus Fb1 of the blue light beam Lb1 is aligned with the target mark position.

On the other hand, the control section 21 controls the shutter 71 of the recording light irradiation surface optical system 70 (FIG. 10) to transmit the blue light beam Lb2 and irradiate it onto the optical disc 100 from the side of the recording light irradiation surface 100B of the optical disc 100.

Still additionally, the control section 21 adjusts the depth d2 of the blue light beam Lb2 (FIG. 3B) by adjusting the position of the movable lens 76 of the relay lens 75 according to the position of the movable lens 61 of the relay lens 60. Thus, as a result, the depth d2 of the blue light focus Fb2 of the blue light beam Lb2 is aligned with depth d1 of the blue light focus Fb1 of the blue light beam Lb1 when it is assumed that the optical disc 100 does not show any surface shake.

Furthermore, the control section 21 has the recording light irradiation surface optical system 70 detect the blue light beam Lb1 after passing through the objective lenses 38 and 79 and then has the drive control section 22 operate for focusing control and tracking control (and hence position control) of the objective lens 79 and tangential control of the galvanomirror 78 according to the outcome of the detection.

Thus, as a result, the blue light focus Fb2 of the blue light beam Lb2 is aligned with the blue light focus Fb1 of the blue light beam Lb1, or the target mark position.

Additionally, the control section 21 adjusts the position of the movable mirror 57 according to the position of the movable lens 61 of the relay lens 60 to suppress the difference of the optical path lengths of the blue light beams Lb1 and Lb2 to not greater than the coherent length.

In this way, the control section 21 of the optical disc apparatus 20 can form a good recording mark RM at the target mark position in the recording layer 101 of the optical disc 100.

Meanwhile, the signal processing section 23 (FIG. 4) generates a recording signal typically representing the binary data of a value equal to "0" or "1" according to the recording information supplied from the external apparatus (not shown). In response, the laser diode 51 emits a blue light beam Lb0 when the value of the recording signal is "1", where as the laser diode 51 does not emit any blue light beam Lb0 when the value of the recording signal is "0".

With this arrangement, the optical disc apparatus 20 forms a recording mark RM at the target mark position in the recording layer 101 of the optical disc 100 when the value of the recording signal is "1", where as the optical disc apparatus 20 does not form any recording mark RM at the target mark position when the value of the recording signal is "0". Thus, it is possible to record the value of "1" or "0" of the recording signal at the target mark position as presence or absence of a recording mark RM. Then, in this way, it is consequently possible to record recording information in the recording layer 101 of the optical disc 100.

(4-2) Reproduction of Information from Optical Disc

When reproducing information from the optical disc 100, the control section 21 of the optical disc apparatus 20 (FIG. 4) irradiates a red light beam Lr1 from the side of the guide-way 100A of the optical disc 100 by means of the guide-way position control optical system 30 (FIG. 7) of the optical pickup 26 and operates the objective lens 38 for focusing control and tracking control (and hence position control) by means of the drive control section 22 according to the outcome of the detection of the red reflected light beam Lr2 that is produced as the red light beam Lr1 is reflected by the guide-way 100A of the optical disc 100.

Additionally, the control section 21 irradiates a blue light beam Lb1 from the side of the guide-way 100A of the optical disc 100 by means of the guide-way information optical system 50 (FIG. 9). At this time, the blue light beam Lb1 is converged to a blue light focus Fb1 by the position-controlled objective lens 38 at a position located at the side opposite to the target track.

Note that the control section 21 is adapted to prevent the recording mark RM from being erased by the blue light beam Lb1 by error by suppressing the emission power of the laser diode 51 in an information reproducing operation.

Additionally, the control section 21 adjusts the depth d1 of the blue light focus Fb1 (FIG. 3B) to make it agree with the target depth by adjusting the position of the movable lens 61 of the relay lens 60. Thus, as a result, the blue light focus Fb1 of the blue light beam Lb1 is aligned with the target mark position.

On the other hand, the control section 21 does not irradiate the blue light beam Lb2 onto the optical disc 100 by controlling the shutter 71 of the recording light irradiation surface optical system 70 (FIG. 10) and intercepting the blue light beam Lb2.

Thus, the optical pickup 26 irradiates only the blue light beam Lb1 onto the recording mark RM recorded at the target mark position in the recording layer 101 of the optical disc 100 as reference light. In response, the recording mark RM operates as hologram and generates a blue reproduction light beam Lb3 at the side of the guide-way 101A as reproduction light. At this time, the guide-way information optical system 50 detects the blue reproduction light beam Lb3 and generates a detection signal according to the outcome of the detection.

In this way, the control section 21 of the optical disc apparatus 20 can detect that a recording mark RM is recorded at the target mark position by generating a blue reproduction light beam Lb3 from the recording mark RM recorded at the target mark position in the recording layer 101 of the optical disc 100 and receiving the blue reproduction light beam Lb3.

When no recording mark RM is recorded at the target mark position, no blue reproduction light beam Lb3 is generated from the target mark position. Then, the optical disc apparatus 20 generates a detection signal that indicates that no blue reproduction light beam Lb3 is received by means of the guide-way information optical system 50.

Then, in response, the signal processing section 22 recognizes if a blue reproduction light beam Lb3 is detected or not by detecting the value of "1" or "0" of the detection signal and generates reproduction information according to the outcome of the recognition.

In this way, the optical disc apparatus 20 receives a blue reproduction light beam Lb3 when a recording mark RM is formed at the target mark position in the recording layer 101 of the optical disc 100, where as it does not receive any blue reproduction light beam Lb3 when no recording mark RM is formed at the target mark position. Thus, the optical disc apparatus 20 can recognize which of "1" or "0" is recorded at the target mark position and consequently reproduce the information recorded in the recording layer 101 of the optical disc 100.

(5) Adjustment of Depth of Blue Light Focus by Guide-Way Information Optical System Meanwhile, the position of the reflection/transmission film 104 fluctuates relative to the objective lens 38 due to the vibrations and the deflections of the optical disc 100 but the optical disc apparatus 20 constantly focuses the red light beam Lr1 at the reflection/transmission film 104 by driving the objective lens 38 according to the red light beam Lr1.

Since the optical disc apparatus 20 irradiates a blue light beam Lb1 onto the optical disc 100 by way of the objective lens 38 same as the objective lens used for the red light beam Lr1, the blue light focus Fb1 moves as the red light focus Fr moves.

Thus, once the movable lens 61 of the relay lens 60 of the optical disc apparatus 100 is moved to the position for focusing the blue light beam Lb1 at the reflection/transmission film 104 in a state where the red light beam Lr1 is focused at the reflection/transmission film 104 by driving the objective lens 38, the blue light beam Lb1 is then driven by the objective lens 38 in such a way that it is constantly focused at the reflection/transmission film 104 thereafter without driving the movable lens 61.

Therefore, the optical disc apparatus 20 can move the depth d1 of the blue light focus Fb1 to the target depth in a state where the red light beam Lr1 is focused at the reflection/transmission film 104 by driving the movable lens 61, referring to the position where the blue light beam Lb1 is focused at the reflection/transmission film 104, by moving the blue light focus Fb1 from the reflection/transmission film 104 by the target depth that is the depth from the reflection/transmission film 104 to the target mark position.

Now, the process of focusing the blue light beam Lr at the reflection/transmission film 104 and the process of moving the blue light focus Fb1 to the target depth will be described sequentially below.

(5-1) Focusing Blue Light Beam at Reflection/Transmission Film

Figure 12:
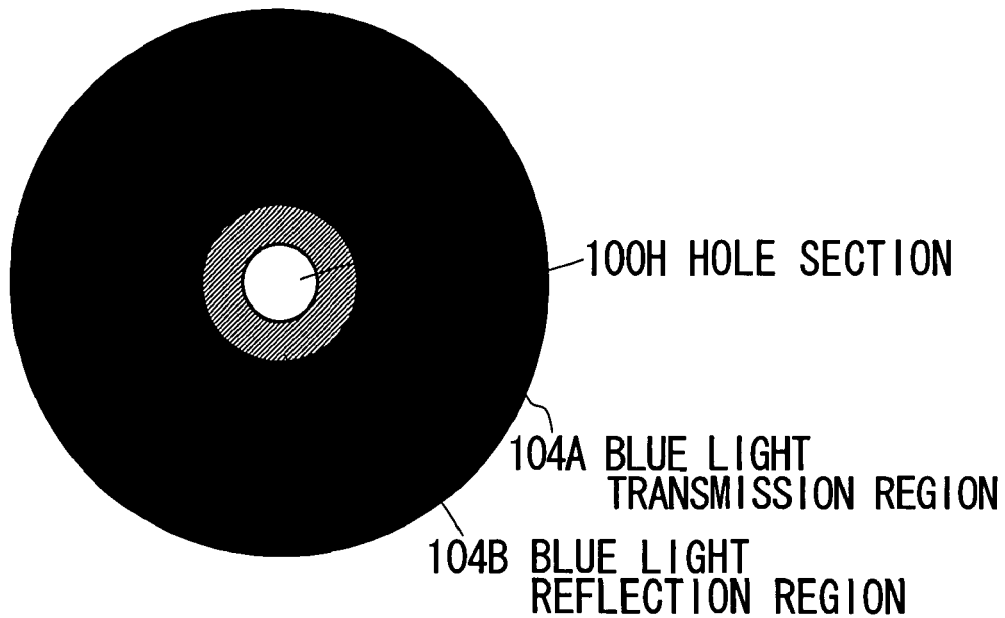
FIG. 12 is a schematic illustration of the reflection/transmission film of an optical disc.

As described above by referring to FIG. 3, a reflection/transmission film 104 is formed on the optical disc 100. Then, a blue light transmission region 104A to be used for recording processes and reproduction processes is formed on the entire area of the optical disc 100 while a blue light reflection region 104B to be used for the process of defining a reference position of a movable lens 61, which will be described in greater detail herein after, is formed near the center of the optical disc 100 and hence around a hole section 100H, or over more than the number of tracks that is required when defining the reference position of the movable lens 61, of the embodiment illustrated in FIG. 12 as will be described in greater detail herein after.

The blue light transmission region 104A is adapted to reflect red light beams Lr1 and transmit blue light beams Lb1 by means of the reflection/transmission film having wavelength selectivity. On the other hand, the blue light reflection region 104B is adapted to reflect both red light beams Lr1 and blue light beams Lb1 by means of a reflection film that does not have any wavelength selectivity.

Note that the blue light transmission region 104A and the blue light reflection region 104B are formed to have a substantially same thickness by means of respective dielectric multilayer films, for example, having the same number of layers. Therefore, the optical disc apparatus 20 can make the surface of the blue light transmission region 104A and the surface (or the interface with the substrate 102) of the blue light reflection region 104B of the optical disc 100 flush with each other as viewed in the direction of depth. In other words, the position of the movable lens 61 when the blue light focus Fb1 is produced in the blue light reflection region 104B can be made agree with the position of the movable lens 61 when the blue light focus Fb1 is produced in the blue light transmission region 104A.

As the control section 21 (FIG. 4) of the optical disc apparatus 20 recognizes that an optical disc 100 is mounted in the optical disc apparatus 20, it emits a red light beam Lr1 from the laser diode 31 of the guide-way position control optical system 30 (FIG. 6). Then, the photodetector 43 receives the red reflected light beam Lr2 that is produced as the red light beam Lr1 is reflected by the reflection/transmission film 104 of the optical disc 100 and generates detection signals SDAr, SDBr, SDCr and SDDr that reflect the respective quantities of light detected by the four regions of the photodetector 43. The photodetector 43 supplies these signals to the signal processing section 23.

The signal processing section 23 (FIG. 4) generates focusing error signal SFEr and tracking error signal STEr from the detection signals SDAr, SDBr, SDCr and SDDr according to the formulas (3) and (4) and supplies them to the drive control section 22. The drive control section 22 drives the sled motor 25 and the objective lens 38 (FIG. 6) to move according to the focusing error signal SFEr and the tracking error signal STEr to focus the red light beam Lr1 to the blue light reflection region 104B formed at an inner peripheral part of the reflection/transmission film 104.

Additionally, the control section 21 emits a blue light beam Lb0 from the laser diode 51 of the guide-way information optical system 50 in a state where the red light beam Lr1 is focused in the blue light reflection region 104B and hence the red light focus Fr1 is located on the surface of the blue light reflection region 104B.

At this time, the blue light beam Lb1 and the blue light beam Lb2 are separated out of the blue light beam Lb0 by means of the beam splitter 55 of the guide-way information optical system 50 and the blue light beam Lb1 is irradiated onto the optical disc 100 by way of the movable lens 61.

As pointed out above, the optical disc apparatus 20 irradiates the red light beam Lr1 onto the blue light reflection region 104B. Since the optical disc apparatus 20 irradiates the blue light beam Lb1 onto the optical disc 100 by way of the objective lens 38 that is the same as the one used for irradiating the red light beam Lr1, the blue light beam Lb1 is also irradiated onto the blue light reflection region 104B.

Thus, the optical disc apparatus 20 reflects the blue light beam Lb1 by means of the blue light reflection region 104B and receives the blue reflected light beam Lb10 thus reflected by means of the photodetector 65. Since the optical disc apparatus 20 intercepts the blue light beam Lb2 entering the recording light irradiation surface optical system 70 by means of the shutter 71, it can receive only the blue reflected light beam Lb10.

Figure 13:
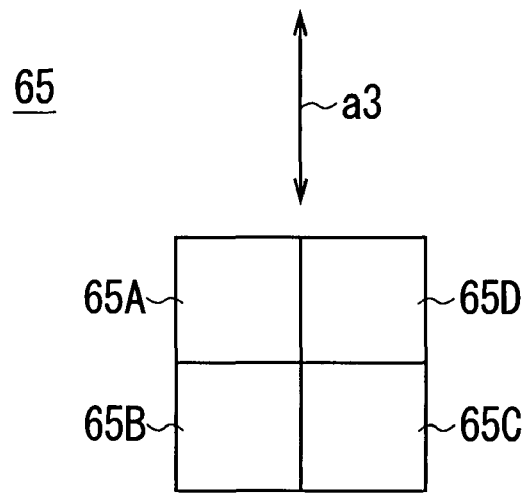
FIG. 13 is schematic illustration of the detection region of photodetector, showing configuration (3) thereof.

As shown in FIG. 13 and like the photodetectors 43 and 82, the photodetector 65 has four detection regions 65A, 65B, 65C and 65D produced by dividing the surface thereof to be irradiated with blue reflected light beam Lb10 and arranged like grids. Note that the direction indicated by arrow a3 in FIG. 13 (the longitudinal direction in FIG. 13) corresponds to the running direction of the track in the reflection/transmission film 104 (FIG. 3) when the blue light beam Lb1 is irradiated.

Figure 14:
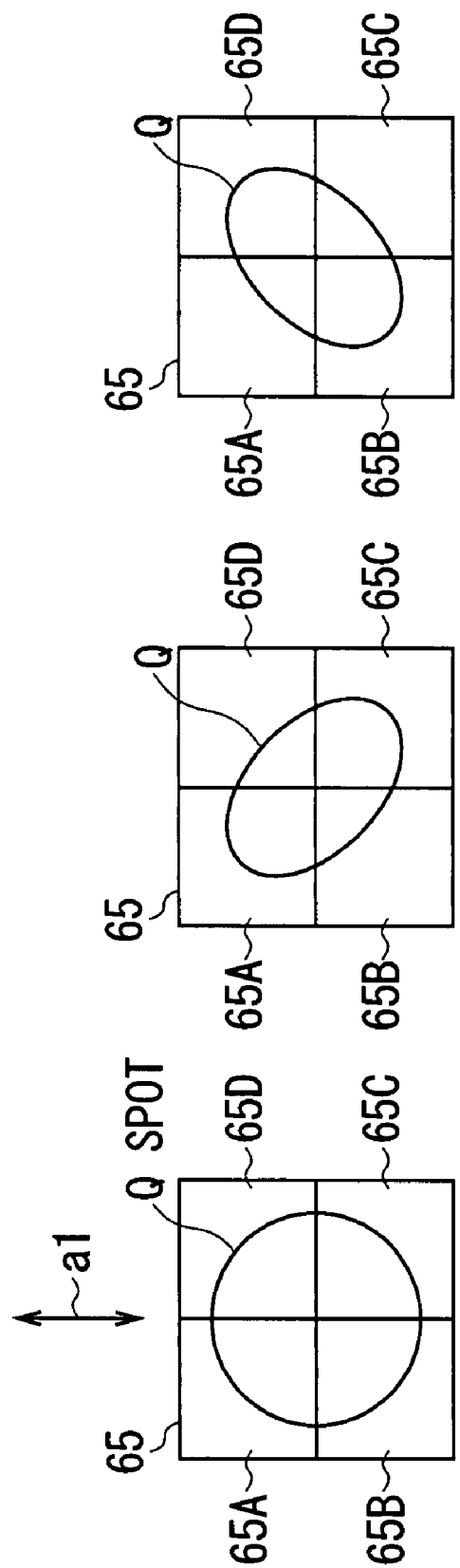
FIGS. 14A through 14C are schematic illustrations of the profiles of spots that can be detected by a photodetector.

The photodetector 65 receives the blue reflected light beam Lb10 by way of the cylindrical lens 64 by means of a so-called astigmatic method. Thus, it receives a spot Q of light that is substantially circular as shown in FIG. 14A when the blue light focus Fb1 is aligned with the blue light reflection region 104B, where as it receives a spot Q of light that is elliptic as shown in FIG. 14B or FIG. 14C when the blue light focus Fb1 is not aligned with the blue light reflection region 104B.

The photodetector 65 detects parts of the blue reflected light beam Lb10 by means of the detection regions 65A, 65B, 65C and 65D and generates detection signal SDAs, SDBs, SDCs and SDDs that reflect the respective quantities of light detected by the four regions, which detection signals are then sent out to the signal processing section 23 (FIG. 4).

The signal processing section 23 subtracts the quantities of received light of the detection regions 65B and 65D from the quantities of received light of the detection regions 65A and 65C according to formula (8) shown below to computationally determine the focusing error signal SFEs that represents the quantity of gap between the blue light focus Fb1 and the blue light reflection region 104B.

$$SFEs=(SDAs+SDCs)-(SDBs+SDDs) \qquad (8)$$

Then, the control section 21 controls the movable lens 61 (FIG. 6) so as to displace the movable lens 61 from an end to the opposite end of the movable range thereof typically in the direction of moving the blue light focus Fb1 away from the objective lens 38 and acquires the focusing error signal SFEs computationally determined by the signal processing section 23.

Figure 15:
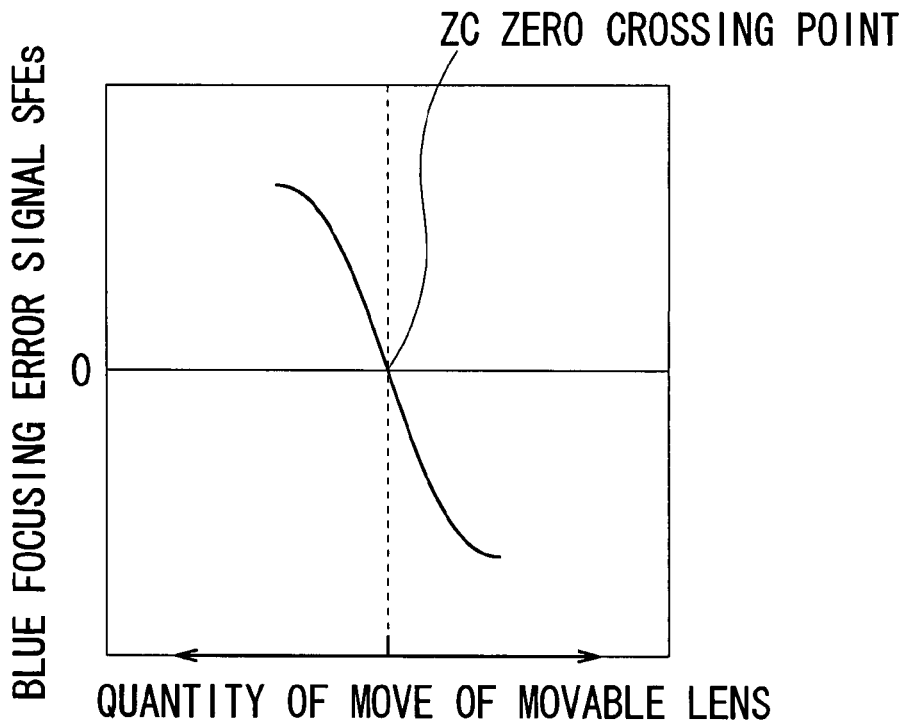
FIG. 15 is a graph illustrating the detection of a zero crossing point.

The control section 21 detects a zero crossing point ZC indicating that the focusing error signal SFEs is equal to nil and hence the blue light focus Fb1 is aligned with the blue light reflection region 104B as shown in FIG. 15. Then, it stores the position of the movable lens 61 at this time in the RAM (not shown) as reference position so as to define the reference position of the movable lens 61.

In this way, the control section 21 of the optical disc apparatus 20 can define the position where the blue light focus Fb1 is aligned with the reflection/transmission film 104 and the red light focus Fr as the reference position of the movable lens 61 by focusing the blue light beam Lb1 in the blue light reflection region 104B when the red light beam Lr1 is focused in the blue light reflection region 104B.

Since the optical disc apparatus 20 constantly focuses the red light beam Lr1 at the reflection/transmission film 104, the blue light beam Lb1 that is irradiated by way of the objective lens same as the one used for the red light beam Lr1 is focused at the reflection/transmission film 104 whenever the movable lens 61 is at the reference position.

Now, the process of moving the target depth of a blue light beam Lb1 will be described below.

(5-2) Move of Blue Light Focus

When recording information on or reproducing information from the optical disc 100, the control section 21 of the optical disc apparatus 20 displaces the movable lens 61 by referring to the reference position according to the target depth that is the depth of the target mark position from the reflection/transmission film 104 in order to irradiate a blue light beam Lb1 exactly onto the target mark position.

More specifically, when the focal length of the fixed lens 62 is $f_1$ and the focal length of the objective lens 38 is $f_2$, while the refractive index of the recording layer 101 is $n_h$ and the target depth is $\delta$, the quantity of displacement $\Delta$ of the movable lens 61 from the reference position thereof is expressed by formula (9) shown below.

$$\delta = n_h(f_2/f_1)^2 \Delta \qquad (9)$$

Since the focal length $f_1$ of the fixed lens 62, the focal length $f_2$ of the objective lens 38 and the refractive index $n_h$ of the recording layer 101 are respectively unequivocally determined by the fixed lens 62, the objective lens 38 and the recording layer 101 that are operated, the quantity of displacement $\Delta$ of the movable lens 61 is proportional to the target depth $\delta$. Note that, as shown in the formula (9), the refractive index of the substrate 102 and that of the substrate 103 are not related to the relationship of the quantity of displacement $\Delta$ of the movable lens 61 and the target depth $\delta$.

Thus, for example, if the guide-way information optical system 50 is so designed that the blue light focus Fb1 of the blue light beam Lb1 is moved by 30 μm when the movable lens 61 is displaced by 1 mm, the control section 21 can move the depth d1 of the blue light focus Fb1 to make it agree with the target depth $\delta$ by displacing the movable lens 61 by 2 mm from the reference position for the target depth $\delta$ of 60 μm.

In operation, the optical disc apparatus 20 displaces the movable lens 61 by a desired distance from the reference position that corresponds to the target depth $\delta$ by driving the movable lens 61 so as to move the blue light focus Fb1 by a distance equal to the difference between the current depth d1 and the target depth $\delta$ according to the drive control signal supplied from the control section 21.

Figure 16:
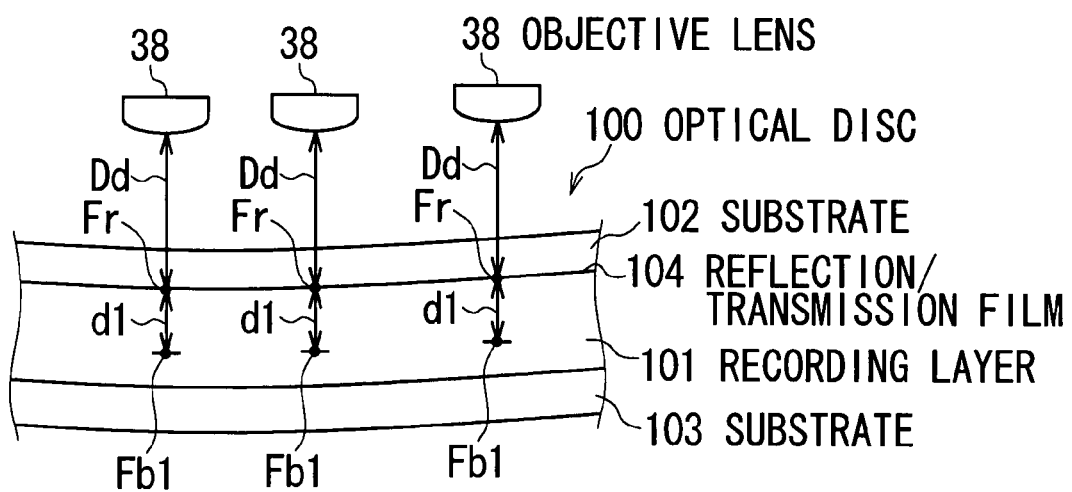
FIG. 16 is a schematic illustration of the relationship between a red light focus and a blue light focus.

In this way, the optical disc apparatus 20 defines the position where the blue light focus Fb1 is aligned with the reflection/transmission film 104 in a state where the red light focus Fr is aligned with the reflection/transmission film 104 as the reference position of the movable lens 61 that corresponds to the mounted optical disc 100 and aligns the blue light focus Fb when the movable lens 61 is at the reference position with the surface of the reflection/transmission film 104 by driving the objective lens 38 to move and adjusting the distance Dd to the reflection/transmission film 104 as shown in FIG. 16.

Thus, the optical disc apparatus 20 can move the depth d1 of the blue light focus Fb1 to the target depth at high precision by displacing the movable lens 61 from the reference position in accordance with the target depth of the blue light focus Fb1.

(6) Adjustment Process of Depth of Blue Light Focus

Figure 17:
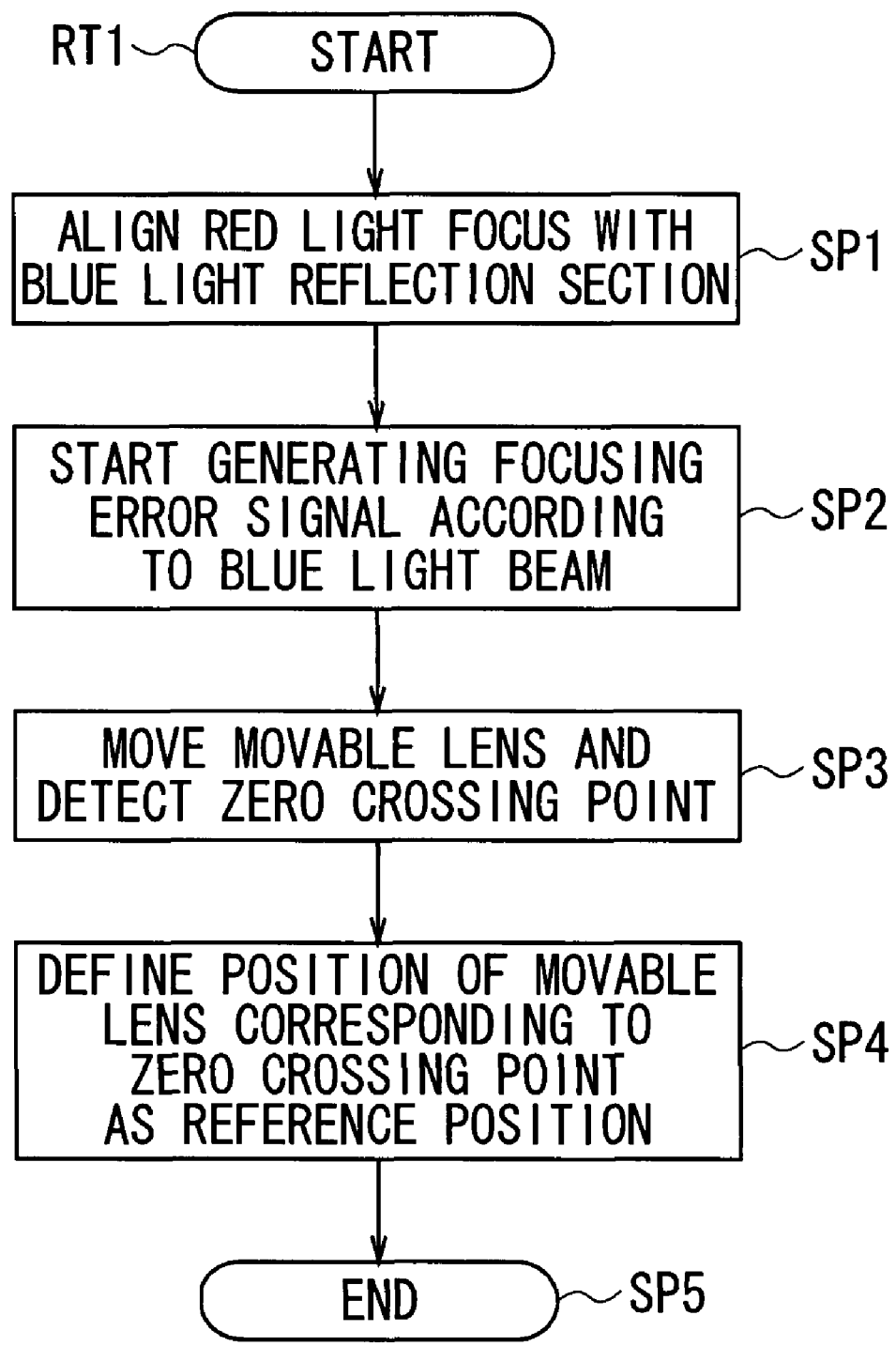
FIG. 17 is a flowchart of the sequence of a process for adjusting the depth of the blue light focus.

Now, the adjustment process of adjusting the depth of the blue light focus that is executed according to a blue light focus depth adjustment program will be described below with reference to flowchart of FIG. 17.

As an optical disc 100 is mounted in the optical disc apparatus 20, the control section 21 of the optical disc apparatus 20 starts the blue light focus depth adjustment process RT1 and proceeds to the next step, or Step SP1.

In Step SP1, the control section 21 aligns the red light focus with the blue light reflection region 104B of the reflection/transmission film 104 by driving the objective lens 38 (FIG. 6) of the guide-way position control optical system 30 to move and then proceeds to the next step, or Step SP2.

In Step SP2, the control section 21 emits a blue light beam Lb0 from the laser diode 51 of the guide-way information optical system 50. As a focusing error signal SFEs starts to be generated according to the blue reflected light beam Lb10 that is produced as the blue light beam Lb1 is reflected by the blue light reflection region 104, the control section 21 proceeds to the next step, or Step SP3.

In Step SP3, the control section 21 drives the movable lens 61 of the relay lens 60 to move over the entire drivable range and monitors the focusing error signal SFEs at this time. As the control section 21 detects a zero crossing point ZC indicating that the blue light beam Lb1 is focused in the blue light reflection region 104B, it proceeds to the next step, or Step SP4.

In Step SP4, the control section 21 defines the position of the movable lens 61 when it detects the zero crossing point in Step SP3 as reference position and then proceeds to the next step, or Step SP5.

The control section 21 is adapted to move the depth d1 of the blue light focus Fb1 to the target depth δ by displacing the movable lens 61 from the reference position by the quantity of displacement corresponding to the target depth δ when it records information on or reproduces information from the optical disc 100.

(7) Operations and Advantages

With the above-described arrangement, the optical disc apparatus 20 drives the objective lens 38 to move so as to focus the red light beam Lr1, which is the first light beam, at the reflection/transmission film 104 that is the reflection/transmission film formed on the optical disc 100 and irradiates the blue light beam Lb1 to the target depth δ to be irradiated by displacing the movable lens 61 of the relay lens 60 that is the focus moving section of the optical disc apparatus 20. Then, the optical disc apparatus 20 focuses the blue light beam Lb1 at the blue light reflection region 104B according to the blue reflected light beam Lb10 that is produced as the blue light beam Lb1 is reflected by the blue light reflection region 104B by displacing the movable lens 61 in the direction of the optical axis of the blue light beam Lb1 in a state where the red light beam Lr1 is focused at the blue light reflection region 104B, which is the reflection region formed in part of the reflection/transmission film 104 to reflect the red light beam Lr1 and the blue light beam Lb1. Then, the optical disc apparatus 20 defines the position of the movable lens 61 when the blue light beam Lb1 is focused as reference position. Thus, the optical disc apparatus 20 moves the blue light focus Fb1 of the blue reflected light beam Lb1 to the target depth δ by displacing the movable leans 61 from the reference position by the distance that corresponds to the distance to the target depth δ.

Thus, the optical disc apparatus 20 can reliably focus the red light focus Fr of the red light beam Lr1 and the blue light focus Fb1 of the blue light beam Lb1, the wavelength of the red light beam Lr1 and that of the blue light beam Lb1 differing from each other, at the reflection/transmission film 104. Then, since the optical disc apparatus 20 drives the objective lens 38 so as to constantly focus the red light beam Fr1 at the reflection/transmission film 104, it is possible to constantly focus the blue light beam Fr1 at the reflection/transmission film 104 whenever the movable lens 61 is at the reference position so that it can highly accurately move the actual depth d1 of the blue light focus Fb1 from the reflection/transmission film 104 to the target depth δ by any desired quantity according to the target depth.

Additionally, since relay lens 60, which has a pair of lenses including the movable lens 61 and the fixed lens 62, is so designed that the quantity of displacement of the movable lens 61 is proportional to the quantity of move of the blue light focus Fb1, it is possible to computationally determine the quantity by which the movable lens 61 is to be displaced from the quantity by which the blue light focus Fb1 is to be moved by way of simple calculations. Thus, it is possible to simplify the configuration of the optical disc apparatus 20.

Additionally, since the optical disc apparatus 20 redefines the reference position each time an optical disc 100 is mounted therein, it is possible to nullify the position error that arises gradually as the movable lens 61 is displaced repeatedly. Thus, it is possible to remarkably highly accurately move the depth d1 to the target depth δ.

Since the optical disc apparatus 20 redefines the reference position each time an optical disc 100 is mounted therein as pointed out above, it is possible to define the reference position for each individual optical disc 100 regardless if the optical disc 100 has an uneven film thickness. Thus, it is possible to remarkably highly accurately move the depth d1 to the target depth δ.

Furthermore, the blue light reflection region 104B is arranged only at the innermost peripheral part of the optical disc 100, the region that cannot be used for information recording and reproduction because it does not transmit a blue light beam Lb1 is minimized. Thus, it is possible to effectively use the surface area of the optical disc 100.

With the above-described arrangement, part of reflection/transmission film 104 is employed as the blue light reflection region 104B and the position in the blue light reflection region 104B where the red light focus Fr and the blue light focus Fb are made to agree with each other is defined as reference position. Then, the optical disc apparatus 20 displaces the movable lens 61 by an arbitrarily selected quantity from the reference position according to the target depth δ. Thus, it is now possible to provide an optical disc apparatus that can highly accurately record a recording mark that represents information on an optical disc or reproduce such a recording mark from an optical disc, a focus position control method that can highly accurately control the focus position of light to be used for recording or reproducing a recording mark and an optical disc that can highly accurately record a recording mark that represents information.

(8) Other Embodiments

Figure 18:
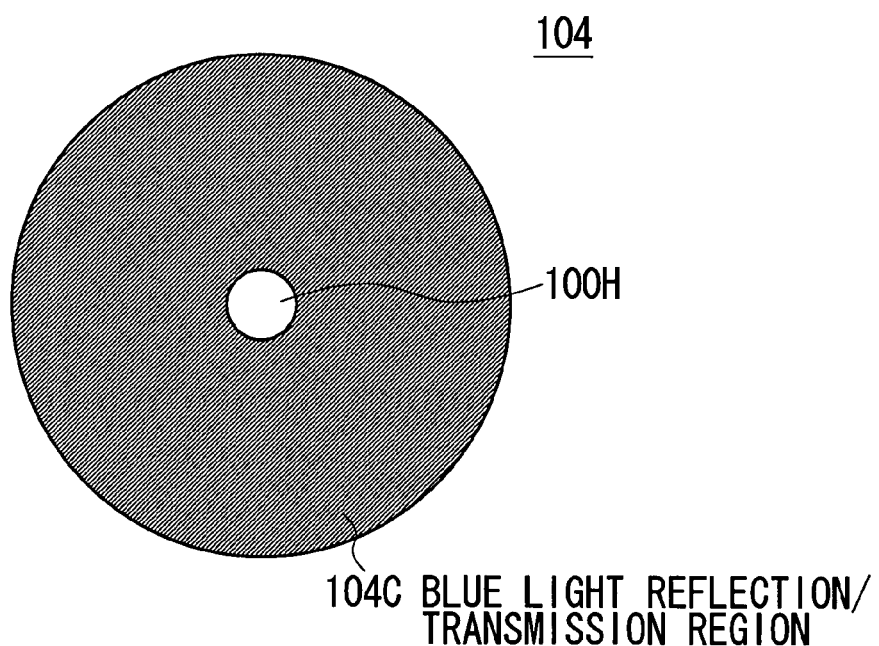
FIG. 18 is a schematic illustration of reflection/transmission film (1) of another embodiment of optical disc.

While a blue light reflection region 104B is formed only near the center of the optical disc 100 in the above-described embodiment, the present invention is by no means limited thereto and, alternatively, one or more than one ring-shaped blue light reflection regions 104B may be arranged in addition to the blue light reflection region 104B arranged at the innermost peripheral part of the optical disc 100 as shown in FIG. 18. With such an arrangement, when the optical disc apparatus 20 record information on or reproduce information from such an optical disc 100, it redefines the reference position of the movable lens 61 each time a blue light beam Lb1 is irradiated onto one of the blue light reflection regions 104B.

With this arrangement, when the optical disc 100 is distorted or deflected and the skew produced in the optical disc 100 is differentiated between the inner peripheral side and the outer peripheral side, it is possible to define the reference position of the movable lens 61 according to the skew. Then, it is possible to highly accurately align the reference focus position of the blue light focus Fb1 with the reflection/transmission film 104.

For example, it may be so arranged that a new reference position is defined each time a blue light beam Lb1 is irradiated onto the track where one of the blue light beam reflection regions 104B is formed, while the optical disc apparatus 20 is executing a reproduction process or a recording process. A blue light reflection region 104B may be detected by the optical disc apparatus 20 by means of the change in the quantity of light as detected by the photodetector 65. Alternatively, the addresses of the blue light reflection regions 104B may be recorded somewhere on the optical disc 100 or information may be recorded in advance in the sector immediately preceding the sector of each blue light reflection region 104B to tell that the blue light reflection region 104B is found in the next sector and also tell the starting track and ending track of the blue light reflection region 104B.

Alternatively, it may be so arranged that, when the optical disc apparatus 20 recognizes that an optical disc 100 is mounted in it, it defines a reference position of the movable lens 61 in each and every one of the blue light reflection regions 104B of the optical disc 100 shown in FIG. 18 and stores it in the RAM so that the reference position to be actually used may be selected according to the track position of the target mark to be recorded or reproduced and the blue light focus Fb1 may be moved to the target depth.

Figure 19:
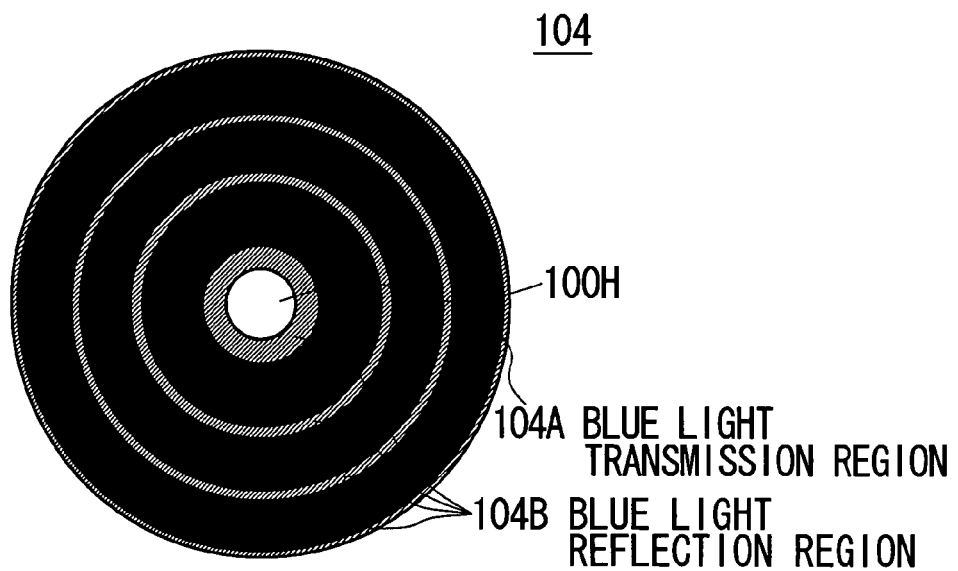
FIG. 19 is a schematic illustration of reflection/transmission film (2) of still another embodiment of optical disc.

While the blue light reflection region 104B that almost totally reflects a blue light beam Lb1 is arranged near the center of the optical disc 100 as part of the reflection/transmission film 104 thereof in the above-described embodiment, the present invention is by no means limited thereto and, alternatively, a blue light reflection region 104C that reflects and transmits a blue light beam Lb1 to a predetermined ratio may be arranged over the entire surface of the optical disc 100 as reflection/transmission film 104 as shown in FIG. 19.

With this arrangement, the optical disc apparatus 20 can always define a reference position for the movable lens 61 regardless of the target mark position of the optical disc 100. Note that, in this case, it is desirable that the blue light beam Lb1 and the blue light beam Lb2 that are separated from each other by means of the polarization beam splitter 55 and irradiated onto the optical disc 100 are made to show the same quantity of light by adjusting the ratio of the quantity of light of the blue light beam Lb1 to that of the blue light beam Lb2.

While the reflection film of the blue light reflection region 104B is arranged in place of the reflection/transmission film of the blue light transmission region 104A in the above-described embodiment, the present invention is by no means limited thereto and, alternatively, the reflection film of the blue light reflection region 104B may be laid on the reflection/transmission film of the blue light transmission region 104A. With such an arrangement, it is preferable to reduce the difference between the film thickness of the blue light reflection region 104B and that of the blue light transmission region 104A to a minimum level (not greater than 2 μm, for example).

While the blue light beam Lb2 is intercepted by means of the shutter 71 when defining a reference position for the movable lens 61 in the above-described embodiment, the present invention is by no means limited thereto and, alternatively, a reflection film that almost totally reflects the blue light beams Lb1 and Lb2 at the opposite sides thereof may be used in the blue light reflection region 104B. With this arrangement, it is possible to receive only the blue reflected light beam Lb10 that is produced when the blue light beam Lb1 is reflected by the blue light reflection region 104B by means of the photodetector 65 regardless if the shutter 71 is open or closed.

While the zero crossing point ZC of the focusing error signal SFEs is detected by means of an astigmatic method and the position of the movable lens 61 at the time of the detection is defined as reference position in the above-described embodiment, the present invention is by no means limited thereto and, alternatively, the point where the reproduction RF signal is maximized when an astigmatic method is used may be detected. Additionally, an astigmatic method may not necessarily be used for the purpose of the present invention. For example, instead of dividing the photodetector 65 into four regions, the photodetector 65 may be divided into a central part and a peripheral part and the point that maximizes the quantity of light of the central part (the reproduction RF signal) may be detected.

While the movable lens 61 is driven to move over the entire drivable range of the movable lens 61 in the above-described embodiment, the present invention is by no means limited thereto and, alternatively, the movable lens 61 may be driven to move over a predetermined drive range that is smaller than the drivable range. For example, the range determined by subtracting the quantity of displacement of the movable lens 61 that is required but variable depending on the largest target depth of the blue light focus Fb1 in the recording layer 101 from the drivable range may be defined as the drive range of the movable lens 61.

While the movable lens 61 is driven to start moving after starting the process of generating a focusing error signal SFEs in the above-described embodiment, the present invention is by no means limited thereto and, alternatively, the movable lens 61 may be driven to start moving simultaneously at the time of starting the emission of the blue light beam Fb0 and the process of generating a focusing error signal SFEs may be started at the same time according to the blue reflected light beam Fb10.

While two blue light beams Lb1 and Lb2 are irradiated onto the optical disc 100 from the opposite sides of the latter in the above-described embodiment, the present invention is by no means limited thereto and, alternatively, both the two blue light beams Lb1 and Lb2 may be irradiated onto one of the opposite sides of the optical disc 100 and one of the blue light beams Lb1 and Lb2 may be directly irradiated onto the target mark position, while the other blue light beam Lb1 or Lb2 may be reflected by a reflection film before it is focused at and irradiated onto the target mark position.

While the red light beam Lr emitted from the laser diode 31 is used as the first light beam and the blue light beam Lb1 emitted from the laser diode 51 is used as the second light beam in the above-described embodiment, the present invention is by no means limited thereto and, alternatively, light beams emitted from the same light source may be used as the first and second light beams.

While the quantity of displacement Δ of the movable lens 61 is made to show a proportional relationship relative to the quantity of move δ of the blue light focus Fb1 as expressed by the formula (9) in the above-described embodiment, the present invention is by no means limited thereto. For example, so long as a predetermined correspondence relationship is defined by means of a table or a predetermined function, it is possible to appropriately displace the movable lens 61 according to the correspondence relationship.

While a reference position is defined each time an optical disc 100 is mounted in the above-described embodiment, the present invention is by no means limited thereto and, alternatively, the optical disc 100 may be identified by the identifier that the optical disc 100 has and the defined reference position may be associated with the optical disc 100 and stored in a memory. With this arrangement, when an optical disc 100 that has been mounted before is mounted again, a recording process or a reproduction process may be executed by using the reference position that corresponds to the optical disc 100 and is stored in the memory.

Then, the optical disc apparatus 20 can define an appropriate reference position that corresponds to the individual optical disc 100 so long as the optical disc 100 has been mounted before so that it is possible to reduce the start up time that needs to be spent between the time when the optical disc 100 is mounted and the time when the reproduction process or the recording process is started.

While the focus moving section is adapted to adjust the depth d1 of the blue light focus Fb1 (or the distance from the reflection/transmission film 104) in the optical disc 100 by displacing the movable lens 61 of the relay lens 60 in the above-described embodiment, the present invention is by no means limited thereto and, alternatively, some other technique may be used to change the depth d1 of the blue light focus Fb1. For example, it is possible to change the depth d1 by moving a single condenser lens.

While the optical axis of the red light beam Lr1 and that of the blue light beam Lb1 are made to agree with each other in the above-described embodiment, the present invention is by no means limited thereto and, alternatively, it may be so arranged that the optical axis of the red light beam Lr1 and that of the blue light beam Lb1 are inclined relative to each other to produce a certain angle between them and the target track and the target mark position are intentionally displaced from each other (to give rise to an offset) as viewed from the guide-way 100A or the recording light irradiation surface 100B of the optical disc 100.

While a focusing error signal is generated by means of an astigmatic method in the guide-way position control optical system 30 (FIG. 7) of the above-described embodiment, the present invention is by no means limited thereto and, alternatively, a focusing error signal may be generated by means of some other technique such as a knife edge method or a Foucault method. Such an alternative technique may also be used for generating a focusing error signal in the recording light irradiation surface optical system 50.

Additionally, the technique for generating a tracking error signal in the guide-way position control optical system 30 is not limited to a push pull method and some other method such as a three-beam method or a differential push pull method may alternatively be used to generate a tracking error signal.

While the reflection/transmission film 104 is arranged between the recording layer 101 and the substrate 102 of the optical disc 100 in the above-described embodiment, the present invention is by no means limited thereto and, alternatively, the reflection/transmission film 104 may be arranged at some other position such as between the recording layer 101 and the substrate 103 or in the inside of the substrate 102 or the recording layer 101.

While a red light beam having a wavelength of about 660 nm is used as light beam for position control of the objective lens 38 (to be referred to as position control light beam) and a blue light beam having a wavelength of about 405 nm is used as light beam for forming a recording mark RM (to be referred to as recording light beam) in the above-described embodiment, the present invention is by no means limited thereto and both the position control light beam and the recording light beam may alternatively have any arbitrarily selected wavelength.

In such a case, it is sufficient for the reflection/transmission film 104 to have a property of reflecting the position control light beam of the arbitrarily selected wavelength and transmitting the recording light beam of the arbitrarily selected wavelength. Further, it is sufficient for the material of the recording layer 101 to have a reaction to a wavelength of the recording light beam.

The blue light transmission region 104A is made to have a wavelength selectivity so as to reflect the position control light beam having a wavelength of about 660 nm and transmit the recording light beam having a wavelength of about 405 nm in the above-described embodiment, the present invention is by no means limited thereto and, alternatively, the blue light transmission region 104A is made to have a polarization selectivity so as to differentiate the direction of polarization between the red light beam Lr1 that operates as position control light beam and the blue light beam Lb1 that operates as recording light beam in such a way that the position control light beam is reflected and the recording light beam is transmitted.

While the optical disc 100 is made to have a diameter of about 120 mm and include a recording layer 101 having a thickness t1 of about 0.3 mm and substrates 102 and 103 having respective thicknesses t2 and t3 of about 0.6 mm in the above-described embodiment, the present invention is by no means limited thereto and the above values may be replaced by some other appropriate values so long as the optical characteristics and the positions of arrangement of the optical parts are selected in such a way that the focuses of the blue light beams Lb1 and Lb2 are aligned with the target mark after taking the thicknesses of the recording layer 101 and the substrates 102 and 103 and the refractive indexes of their materials into consideration.

While a standing wave is recorded on the optical disc 100 as micro hologram by irradiating a blue light beam Lb2 that is the third light beam emitted from the laser diode 51 that also emits the blue light beam Lb1 from the side opposite to the blue light beam Lb1 by way of an objective lens 79 that is different from the objective lens 38 so as to make its focus agree with the focus of the blue light beam Lb1 in the above-described embodiment, the present invention is by no means limited thereto and it may alternatively be so arranged that a recording mark is simply recorded by means of a blue light beam Lb1.

While the optical disc apparatus 20 of the above-described embodiment includes a drive control section 22 that operates as objective lens drive section, a movable section 61 that operates as focus moving section and a control section 21 that operates as focus movement control section, the present invention is by no means limited thereto and, alternatively, an optical disc apparatus according to the embodiment of the present invention may include an objective lens drive section, a focus moving section and a focus movement control section that have other respective configurations selected from a variety of possible configurations.

The present invention can find applications in the field of optical disc apparatus adapted to record a large volume of data such as music contents, image contents or some other type of data on an optical disc that operates as recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus for recording or reproducing recording marks by irradiating a first light emitted from a light source and a second light having a wavelength different from the first light onto an optical disc by way of an objective lens, the apparatus comprising:
   an objective lens drive section that drives the objective lens for focusing the first light in a reflection/transmission layer formed on the optical disc and adapted to reflect the first light and transmit the second light according to the first light reflected by the reflection/transmission layer;
   a focus moving section that moves a focus of the second light in a direction of an optical axis thereof by way of displacement of itself along the optical axis of the second light to make the focus of the second light agree with a target depth of the optical disc to be irradiated by the second light; and
   a focus movement control section that displaces the focus moving section by a quantity of displacement corresponding to the target depth from a reference position in order to move the focus of the second light to the target depth;
   the focus movement control section being adapted to focus the second light on a reflection region formed on part of the reflection/transmission layer to reflect both the first light and the second light according to the second light reflected by the reflection region in a state where the first light is focused on the reflection region and define a position of the focus moving section at a time of the focusing of the second light as reference position.

2. The optical disc apparatus according to claim 1, further comprising:
   a detection section that receives the second light reflected by the reflection region and generates a detection signal; and
   a focusing error signal generation section that generates a focusing error signal representing the quantity of displacement of the second light in the direction of the optical axis thereof according to the detection signal;
   the focus movement control section focusing the second light on the reflection region according to the focusing error signal.

3. The optical disc apparatus according to claim 1, wherein the focus moving section is designed to show a proportional relationship between the quantity of its displacement and a quantity of movement of the focus of the second light.

4. The optical disc apparatus according to claim 1, wherein the focus moving section is a movable lens combined with a predetermined fixed lens to form a relay lens.

5. The optical disc apparatus according to claim 1, wherein:
   the objective lens is a first object lens; and
   a third light emitted from the second light is irradiated from the side opposite to the second light and focused so as to agree with the focus of the second light by way of a second objective lens in order to record a standing wave as a micro hologram on the optical disc.

6. The optical disc apparatus according to claim 1, wherein the focus movement control section defines the reference position each time the optical disc is mounted in the optical disc apparatus.

7. The optical disc apparatus according to claim 1, wherein as the focus movement control section recognizes the reflection region formed on the optical disc when recording a first recording mark on or reproducing a second recording mark from the optical disc, it defines a new reference position.

8. An optical disc apparatus for recording or reproducing recording marks by irradiating a first light emitted from a light source and a second light having a wavelength different from the first light onto an optical disc by way of an objective lens, the apparatus comprising:
   an objective lens drive section that drives the objective lens for focusing the first light in a reflection/transmission layer formed on the optical disc and adapted to reflect the first light so as to reflect and transmit the second light in a predetermined ratio according to the first light reflected by the reflection/transmission layer;
   a focus moving section that moves a focus of the second light in a direction of an optical axis thereof by way of displacement of itself along the optical axis of the second light to make the focus of the second light agree with a target depth of the optical disc to be irradiated by the second light; and
   a focus movement control section that displaces the focus moving section by an arbitrarily selected quantity from a reference position in order to move the focus of the second light to the target depth;
   the focus movement control section being adapted to focus the second light on the reflection/transmission layer according to the second light reflected by a reflection/transmission in a state where the first light is focused on the reflection/transmission layer and define a position of the focus moving section at a time of the focusing of the second light as reference position.

9. A focus position control method to be used when recording or reproducing recording marks by irradiating a first light emitted from a light source and a second light having a wavelength different from the first light onto an optical disc by way of an objective lens, the method comprising:
   a first light focusing step of focusing the first light on a reflection region that reflects the first light and the second light and is formed in part of a reflection/transmission layer formed on the optical disc and adapted to reflect the first light and transmit the second light by means of the objective lens driven to focus the first light in the reflection/transmission layer according to the first light reflected by the reflection/transmission layer;
   a second light focusing step of focusing the second light in the reflection region by means of a focus moving section for moving a focus of the second light in a direction of an optical axis thereof by way of displacement of itself along the optical axis of the second light according to the second light reflected by the reflection region in a state where the first light is focused on the reflection region;
   a reference position defining step of defining a position of the focus moving section at the time of focusing the second light in the reflection region in the second light focusing step as a reference position; and
   a focus position control step of aligning the focus of the second light with a target depth of the optical disc to be irradiated by the second light by displacing the focus moving section from the reference position by a quantity of displacement corresponding to the target depth to be irradiated by the second light in a state where the first light is focused on the reflection region, thereby moving the focus of the second light in the direction of the optical axis of the second light.

10. A focus position control method to be used when recording or reproducing recording marks by irradiating a first light emitted from a light source and a second light having a wavelength different from the first light onto an optical disc by way of an objective lens, the method comprising:

a first light focusing step of focusing the first light on a reflection/transmission layer formed on the optical disc and adapted to reflect the first light and transmit and reflect the second light in a predetermined ratio by driving the objective lens according to the first light reflected by the reflection/transmission layer;

a second light focusing step of focusing the second light on the reflection/transmission layer by means of a focus moving section adapted to move a focus of the second light by way of displacement of the second light according to the second light reflected by the reflection/transmission layer in a state where the first light is focused on the reflection/transmission layer;

a reference position defining step of defining a position of the focus moving section at a time of focusing the second light in the reflection/transmission layer in the second light focusing step as a reference position; and a focus position control step of aligning the focus of the second light with a target depth of the optical disc to be irradiated by the second light by moving a focus movement control section from the reference position by an arbitrarily selected quantity, thereby moving the focus of the second light in a direction of the optical axis thereof in a state where the first light is focused in the reflection/transmission layer.

11. An optical disc to be irradiated with a first light and a second light, the second light having a wavelength different from the first light, through an objective lens, the optical disc comprising:

a recording layer that records recording marks by the second light; and a reflection/transmission layer that reflects the first light and transmits the second light;

the reflection/transmission layer being adapted to reflect part of the second light in order to align a focus of the second light with the reflection/transmission layer.

* * * * *